United States Patent
Chai

(10) Patent No.: US 10,880,706 B2
(45) Date of Patent: Dec. 29, 2020

(54) CONVERGENT CHARGING METHOD AND DEVICE

(71) Applicant: Huawei Technologies Co., Ltd., Shenzhen (CN)

(72) Inventor: Xiaoqian Chai, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/696,381

(22) Filed: Nov. 26, 2019

(65) Prior Publication Data
US 2020/0100075 A1 Mar. 26, 2020

Related U.S. Application Data

(63) Continuation of application No. PCT/CN2018/098229, filed on Aug. 2, 2018.

(30) Foreign Application Priority Data

Nov. 16, 2017 (CN) .......................... 2017 1 1139241

(51) Int. Cl.
*H04W 80/10* (2009.01)
*H04W 4/24* (2018.01)
*H04M 15/00* (2006.01)

(52) U.S. Cl.
CPC ............. *H04W 4/24* (2013.01); *H04M 15/66* (2013.01); *H04W 80/10* (2013.01)

(58) Field of Classification Search
CPC ...................................................... H04W 4/24
See application file for complete search history.

(56) References Cited

U.S. PATENT DOCUMENTS

| 2013/0316673 A1 | 11/2013 | Goldner | |
| 2015/0365537 A1* | 12/2015 | Kahn | H04M 15/65 |
| | | | 455/408 |
| 2019/0053147 A1* | 2/2019 | Qiao | H04M 15/66 |

FOREIGN PATENT DOCUMENTS

| CN | 1859533 A | 11/2006 |
| CN | 101132289 A | 2/2008 |
| CN | 101267321 A | 9/2008 |
| CN | 101488864 A | 7/2009 |
| CN | 102348187 A | 2/2012 |

(Continued)

OTHER PUBLICATIONS

Machine Translation and Abstract of Chinese Publication No. CN1859533, Nov. 8, 2006, 21 pages.

(Continued)

*Primary Examiner* — Michael T Vu
(74) *Attorney, Agent, or Firm* — Conley Rose, P.C.

(57) ABSTRACT

A convergent charging method includes determining, by a session management function (SMF), a charging type of a first data flow and a charging type of a second data flow, where the charging type is online charging or offline charging. The method further includes sending, by the SMF, a first message to a charging server using an online-offline convergent charging session based on the charging types of the first data flow and the second data flow, where the first message includes a first online charging request of the first data flow or a first offline charging request of the second data flow, and the online-offline convergent charging session is used to send the first online charging request and the first offline charging request.

21 Claims, 12 Drawing Sheets

(56) References Cited

FOREIGN PATENT DOCUMENTS

| CN | 105722048 A | 6/2016 |
|---|---|---|
| WO | 2009124594 A1 | 10/2009 |

OTHER PUBLICATIONS

Machine Translation and Abstract of Chinese Publication No. CN101132289, Feb. 27, 2008, 41 pages.
Machine Translation and Abstract of Chinese Publication No. CN101267321, Sep. 17, 2008, 18 pages.
Machine Translation and Abstract of Chinese Publication No. CN101488864, Jul. 22, 2009, 19 pages.
Machine Translation and Abstract of Chinese Publication No. CN102348187, Feb. 8, 2012, 14 pages.
Machine Translation and Abstract of Chinese Publication No. CN105722048, Jun. 29, 2016, 22 pages.
Foreign Communication From a Counterpart Application, Chinese Application No. 201711139241.4, Chinese Office Action dated Jan. 3, 2020, 9 pages.
Foreign Communication From a Counterpart Application, PCT Application No. PCT/CN2018/098229, English Translation of International Search Report dated Oct. 26, 2018, 2 pages.
XP051260138, S5-173238, Huawei Technologies, "pCR TR 32.899 Interaction between SMF and UPF," 3GPP TSG SA WG5 (Telecom Management) Meeting #113, May 8-12, 2017, West Palm Beach, Florida(US), 5 pages.
XP051391655, 3GPP TR 32.899 V1.1.1, "3rd Generation Partnership Project; Technical Specification Group Services and System Aspects; Telecommunication management; Charging management; Study on charging aspects of 5G system architecture phase 1 (Release 15)," Nov. 2017, 84 pages.

\* cited by examiner

CONVERGENT CHARGING METHOD AND DEVICE

CROSS-REFERENCE TO RELATED APPLICATIONS

This application is a continuation of International Patent Application No. PCT/CN2018/098229, filed on Aug. 2, 2018, which claims priority to Chinese Patent Application No. 201711139241.4, filed on Nov. 16, 2017. The disclosures of the aforementioned applications are hereby incorporated by reference in their entireties.

TECHNICAL FIELD

This application relates to the communications field, and more specifically, to a convergent charging method and a device.

BACKGROUND

Currently, an online charging system (OCS) and an offline charging system are included in each of charging architectures in a 3rd generation mobile communications technology (3G) and a 4th generation mobile communications technology (4G). In the OCS, a charging trigger function (CTF) is connected to an online charging function (OCF) through an Ro interface. In the offline charging system, the CTF is connected to a charging data function (CDF) through an radio frequency interface. Based on the charging architecture in which online charging is separated from offline charging, when configuring a product, an operator is confronted with complex coordination and cooperation between a plurality of systems, limiting flexibility of service provisioning of the operator. In a 5th generation mobile communications technology (5G), there are many limitations on industry application support, and because the charging system is limited by intervention of an external system in online charging and offline charging, processing performed by the charging system is complex.

SUMMARY

This application provides a convergent charging method and a device, to request online charging and offline charging based on an online-offline convergent charging session, simplify a charging architecture, and improve flexibility of service provisioning of an operator.

According to a first aspect, a convergent charging method is provided. The method includes determining, by a session management function (SMF), charging type of a first data flow and a second data flow, where the charging type is online charging or offline charging, and sending, by the SMF, a first message to a charging server using an online-offline convergent charging session based on the charging types of the first data flow and the second data flow, where the first message includes a first online charging request of the first data flow, or the first message includes a first offline charging request of the second data flow, or the first message includes a first online charging request of the first data flow and a first offline charging request of the second data flow, and the online-offline convergent charging session is used to send the first online charging request and the first offline charging request.

Therefore, in this embodiment of this application, the SMF sends the first online charging request to the charging server using the online-offline convergent charging session, or the SMF sends the first offline charging request to the charging server using the online-offline convergent charging session, or the SMF sends the first online charging request and the first offline charging request to the charging server using the online-offline convergent charging session, to request online charging and offline charging based on the online-offline convergent charging session, simplify a charging architecture, and improve flexibility of service provisioning of an operator.

With reference to the first aspect, in some implementations of the first aspect, the first online charging request includes a first quota application, and the first offline charging request includes consumption information statistics, or the first offline charging request includes a second quota application and first indication information, indicate indicating that an applied second quota is a virtual quota.

With reference to the first aspect, in some implementations of the first aspect, the SMF receives, using the online-offline convergent charging session, a second message sent by the charging server, where the second message includes at least one of response information of the first online charging request or response information of the first offline charging request, the response information of the first online charging request includes a first quota allocated to the first quota application of the first data flow, and when the first offline charging request includes the consumption information statistics, the response information of the first offline charging includes a processing result of the consumption information statistics, or when the first offline charging request includes the second quota application and first indication information, the response information of the first offline charging includes a second quota allocated to the second quota application of the second data flow and the first indication information.

With reference to the first aspect, in some implementations of the first aspect, the second message further includes an identifier corresponding to the first quota, and the identifier is used to indicate, when use information of the first quota is reported to the charging server, to the charging server that the reported use information is usage of the first quota.

With reference to the first aspect, in some implementations of the first aspect, when a first charging trigger condition of the first data flow is satisfied, the SMF sends a third message to the charging server using the online-offline convergent charging session, where the third message includes a second online charging request of the first data flow, or when a second charging trigger condition of the second data flow is satisfied, the SMF sends a third message to the charging server using the online-offline convergent charging session, where the third message includes a second offline charging request of the second data flow, or when a first charging trigger condition of the first data flow is satisfied and a second charging trigger condition of the second data flow is satisfied, the SMF sends a third message to the charging server using the online-offline convergent charging session, where the third message includes a second online charging request of the first data flow and a second offline charging request of the second data flow.

With reference to the first aspect, in some implementations of the first aspect, the second online charging request includes at least one of a third quota application and use information of the first quota, and the second offline charging request includes consumption information statistics, or the second offline charging request includes second indication information and at least one of use information of the second quota and a fourth quota application, and the second indication information is used to indicate that the fourth quota or the use information of the second quota is a virtual quota.

With reference to the first aspect, in some implementations of the first aspect, the third message further includes at least one of third indication information corresponding to the first data flow and fourth indication information corresponding to the second data flow, where the third indication information is used to instruct to perform online charging on the first data flow, and the fourth indication information is used to instruct to perform offline charging on the second data flow.

With reference to the first aspect, in some implementations of the first aspect, before the SMF sends the third message to the charging server using the online-offline convergent charging session, the SMF receives, using the online-offline convergent charging session, a fourth message sent by the charging server, where the fourth message is used to instruct to send the third message using the online-offline convergent charging session, and when the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

With reference to the first aspect, in some implementations of the first aspect, before sending the first message, the SMF sends an online-offline convergent charging session establishment request to the charging server, or the first message includes an online-offline convergent charging session establishment request.

With reference to the first aspect, in some implementations of the first aspect, in the online-offline convergent charging session, when the charging type of the first data flow is online charging and an online charging trigger condition of the first data flow is satisfied, and the second data flow is offline charging and an offline charging trigger condition of the second data flow is satisfied, the SMF sends the online charging request of the first data flow and the offline charging request of the second data flow.

With reference to the first aspect, in some implementations of the first aspect, when determining that online charging and offline charging do not need to be performed, the SMF sends a fifth message to the charging server, to request the charging server to terminate the online-offline convergent charging session.

With reference to the first aspect, in some implementations of the first aspect, the SMF obtains a static charging policy or obtains a dynamic charging policy of a policy control function (PCF), where the dynamic charging policy and the static charging policy include the charging types of the first data flow and the second data flow, and the SMF determines, according to the dynamic charging policy or the static charging policy, that charging type of the first data flow is online charging and charging type of the second data flow is offline charging.

According to a second aspect, a convergent charging method is provided. The method includes receiving, by a charging server using an online-offline convergent charging session, a first message sent by a SMF, where the first message includes a first online charging request of a first data flow, or the first message includes a first offline charging request of a second data flow, or the first message includes a first online charging request of the first data flow and a first offline charging request of the second data flow, and the online-offline convergent charging session is used to send the first online charging request and the first offline charging request, and sending, by the charging server, a second message to the SMF, where when the first message includes the first online charging request of the first data flow, the second message includes response information of the first online charging request, when the first message includes the first offline charging request of the second data flow, the second message includes response information of the first offline charging request, or when the first message includes the first online charging request of the first data flow and the first offline charging request of the second data flow, the second message includes response information of the first online charging request and response information of the first offline charging request.

With reference to the second aspect, in some implementations of the second aspect, the response information of the first online charging request includes a first quota allocated to a first quota application of the first data flow, and when the first offline charging request includes consumption information statistics, the response information of the first offline charging request includes a processing result of the consumption information statistics, or when the first offline charging request includes a second quota application and a first indication information, the response information of the first offline charging request includes a second quota allocated to the second quota application of the second data flow and the first indication information.

With reference to the second aspect, in some implementations of the second aspect, the charging server receives, using the online-offline convergent charging session, a third message sent by the SMF, where the third message includes a second online charging request of the first data flow, or a second offline charging request of the second data flow, or a second online charging request of the first data flow and a second offline charging request of the second data flow.

With reference to the second aspect, in some implementations of the second aspect, the second online charging request includes at least one of a third quota application and consumption information of the first quota, and the second offline charging request includes consumption information statistics, or the second offline charging request includes consumption information of the second quota or a fourth quota application, and second indication information, and the second indication information is used to indicate that a fourth quota is a virtual quota.

With reference to the second aspect, in some implementations of the second aspect, the third message further includes at least one of third indication information corresponding to the first data flow and fourth indication information corresponding to the second data flow, where the third indication information is used to instruct to perform online charging on the first data flow, and the fourth indication information is used to instruct to perform offline charging on the second data flow.

With reference to the second aspect, in some implementations of the second aspect, the charging server deducts the reserved first quota based on the use information of the first quota, or the charging server allocates the third quota based on the third quota application, or the charging server generates a charging data record based on the consumption information statistics, or the charging server generates a charging data record based on the consumption information of the second quota and the second indication information, or the charging server allocates the fourth quota based on the fourth quota application and the second indication information.

With reference to the second aspect, in some implementations of the second aspect, before receiving the third message, the charging server sends a fourth message to the SMF using the online-offline convergent charging session, where the fourth message is used to instruct to send the third message using the online-offline convergent charging session, and when the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

With reference to the second aspect, in some implementations of the second aspect, before receiving the first message, the charging server receives an online-offline convergent charging session request sent by the SMF, to establish the online-offline convergent charging session, or the charging server receives the first message including an online-offline convergent charging session establishment request, to establish the online-offline convergent charging session.

With reference to the second aspect, in some implementations of the second aspect, in the online-offline convergent charging session, when the charging type of the first data flow is online charging and an online charging trigger condition of the first data flow is satisfied, and the second data flow is offline charging and an offline charging trigger condition of the second data flow is satisfied, the charging server receives the online charging request of the first data flow and the offline charging request of the second data flow.

With reference to the second aspect, in some implementations of the second aspect, the charging server receives a fifth message sent by the SMF, and the charging server terminates the online-offline convergent charging session based on the fifth message.

According to the third aspect, a convergent charging method is provided. The method includes receiving, by a charging server using an online-offline convergent charging session, a first message sent by a SMF, where the first message includes a first quota application of a first data flow, or the first message includes a second quota application of a second data flow, or the first message includes a first quota application of a first data flow and a second quota application of the second data flow, and the online-offline convergent charging session is used to send a first online charging request and a first offline charging request, determining, by the charging server, charging types of the first data flow and the second data flow, where the charging type is online charging or offline charging, and sending, by the charging server, a second message to the SMF using the online-offline convergent charging session based on the charging types of the first data flow and the second data flow, where when the first message includes the first quota application of the first data flow, the second message includes a first quota allocated by the charging server to the first data flow, when the first message includes the second quota application of the second data flow, the second message includes the second quota application of the second data flow and first indication information allocated to the second data flow, and the first indication information is used to instruct the SMF to perform offline charging on the second data flow, or the second message includes a second quota that are allocated by the charging server to the second data flow and second indication information, and the second indication information is used to indicate that the second quota is a virtual quota, or when the first message includes the first quota application of the first data flow and the second quota application of the second data flow, the second message includes a first quota allocated by the charging server to the first data flow, a second quota allocated by the charging server to the second data flow, and first indication information allocated to the second data flow, and the first indication information is used to instruct the SMF to perform offline charging on the second data flow, or the second message includes a first quota allocated by the charging server to the first data flow and the second quota that are allocated by the charging server to the second data flow and second indication information, and the second indication information is used to indicate that the second quota is a virtual quota.

With reference to the third aspect, in some implementations of the third aspect, when it is determined that a charging type of a service data flow of a first service is online charging, the second message further includes service data flow information corresponding to the first quota, or when it is determined that a charging type of a service data flow of the first service is offline charging, the second message includes service data flow information corresponding to the first indication information, or when it is determined that a charging type of a service data flow of the first service is offline charging, the second message includes service data flow information corresponding to the second quota.

With reference to the third aspect, in some implementations of the third aspect, when the first data flow and the second data flow use a same rating group, the second message further includes a flow identifier corresponding to the second data flow, the flow identifier is used to instruct the SMF to report consumption information statistics of the second data flow corresponding to the flow identifier.

With reference to the third aspect, in some implementations of the third aspect, the charging server receives, using the online-offline convergent charging session, a third message sent by the SMF, where the third message includes at least one of a third quota application of the first data flow and consumption information of the first quota, or the consumption information statistics of the second data flow or a fourth quota application, and second indication information, or consumption information of the second quota and second indication information, and the second indication information is used to indicate a virtual quota.

With reference to the third aspect, in some implementations of the third aspect, the third message further includes at least one of third indication information corresponding to the first data flow and fourth indication information corresponding to the second data flow, where the third indication information is used to instruct to perform the online charging on the first data flow, and the fourth indication information is used to instruct to perform the offline charging on the second data flow.

With reference to the third aspect, in some implementations of the third aspect, the charging server deducts the reserved first quota based on the consumption information of the first quota, or the charging server allocates the third quota based on the third quota application, or the charging server generates a charging data record based on the consumption information statistics of the second data flow, or the charging server allocates a fourth quota based on the fourth quota application and the second indication information, or the charging server generates a charging data record based on the consumption information of the second quota and the second indication information.

With reference to the third aspect, in some implementations of the third aspect, before receiving the third message, the charging server sends a fourth message to the SMF using the online-offline convergent charging session, where the fourth message is used to instruct to send the third message using the online-offline convergent charging session, and when the first data flow and the second data flow correspond to a same rating group, when the fourth message includes the same rating group, the third message includes a second online charging request of the first data flow and a second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

With reference to the third aspect, in some implementations of the third aspect, before receiving the first message, the charging server receives an online-offline convergent charging session request sent by the SMF, to establish the online-offline convergent charging session, or the charging server receives the first message including an online-offline convergent charging session establishment request, to establish the online-offline convergent charging session.

With reference to the third aspect, in some implementations of the third aspect, when a PCF establishes a protocol data unit (PDU) session, the charging server receives a charging policy sent by the PCF and corresponding to the PDU session, or when receiving the first message sent by the SMF, the charging server requests a charging policy corresponding to a PDU session from a PCF.

With reference to the third aspect, in some implementations of the third aspect, the charging server determines, according to the charging policy, that the charging type of the first data flow is online charging and the charging type of the second data flow is offline charging.

With reference to the third aspect, in some implementations of the third aspect, the charging server receives a fifth message sent by the SMF, and the charging server terminates the online-offline convergent charging session based on the fifth message.

According to a fourth aspect, a convergent charging method is provided. The method includes sending, by a SMF, a first message to a charging server using an online-offline convergent charging session, where the first message includes a first quota application of a first data flow, or the first message includes a second quota application of the second data flow, or the first message includes a first quota application of a first data flow and a second quota application of the second data flow, and the online-offline convergent charging session is used to send a first online charging request and a first offline charging request, and receiving, by the SMF using the online-offline convergent charging session, a second message sent by the charging server, where when the first message includes the first quota application of the first data flow, the second message includes a first quota allocated by the charging server to the first data flow, when the first message includes the second quota application of the second data flow, the second message includes a second quota allocated to the second data flow and first indication information allocated to the second data flow, and the first indication information is used to instruct the SMF to perform offline charging on the second data flow, or the second message includes the second quota that are allocated by the charging server to the second data flow and second indication information, and the second indication information is used to indicate that the second quota is a virtual quota, or when the first message includes the first quota application of the first data flow and the second quota application of the second data flow, the second message includes a first quota allocated by the charging server to the first data flow, the second quota application of the second data flow, and first indication information allocated to the second data flow, and the first indication information is used to instruct the SMF to perform offline charging on the second data flow, or the second message includes the first quota allocated by the charging server to the first data flow and the second quota that are allocated by the charging server to the second data flow and second indication information, and the second indication information is used to indicate that the second quota is a virtual quota.

With reference to the fourth aspect, in some implementations of the fourth aspect, when a first charging trigger condition of the first data flow is satisfied, the SMF sends a third message to the charging server using the online-offline convergent charging session, where the third message includes at least one of a third quota application of the first data flow and consumption information of the first quota, or when a second charging trigger condition of the second data flow is satisfied, the SMF sends a third message to the charging server using the online-offline convergent charging session, where the third message includes consumption information statistics of the second data flow or a fourth quota application, and second indication information, and the second indication information is used to indicate that a fourth quota is a virtual quota, or when a second charging trigger condition of the second data flow is satisfied, the SMF sends a third message to the charging server using the online-offline convergent charging session, where the third message includes use information statistics of the second quota or a fourth quota application, and second indication information, and the second indication information is used to indicate that the fourth quota is a virtual quota, or when a first charging trigger condition of the first data flow is satisfied and a second charging trigger condition of the second data flow is satisfied, the SMF sends a third message to the charging server using the online-offline convergent charging session, where the third message includes at least one of a third quota application of the first data flow and consumption information of the first quota, consumption information statistics of the second data flow or a fourth quota application, and second indication information, and the second indication information is used to indicate that the fourth quota is a virtual quota, or the third message includes at least one of a third quota application of the first data flow and consumption information of the first quota, use information statistics of the second quota or a fourth quota application, and second indication information, and the second indication information is used to indicate that the fourth quota is a virtual quota.

With reference to the fourth aspect, in some implementations of the fourth aspect, the third message further includes at least one of third indication information corresponding to the first data flow and fourth indication information corresponding to the second data flow, where the third indication information is used to instruct to perform the online charging on the first data flow, and the fourth indication information is used to instruct to perform the offline charging on the second data flow.

With reference to the fourth aspect, in some implementations of the fourth aspect, before the SMF sends the third message to the charging server using the online-offline convergent charging session, the SMF receives, using the online-offline convergent charging session, a fourth message sent by the charging server, where the fourth message is used to instruct to send the third message using the online-offline convergent charging session, and when the first data flow and the second data flow correspond to a same rating group, when the fourth message includes the same rating group, the third message includes a second online charging request of the first data flow and a second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

With reference to the fourth aspect, in some implementations of the fourth aspect, before sending the first message, the SMF sends an online-offline convergent charging session establishment request to the charging server, or the first message includes an online-offline convergent charging session establishment request.

With reference to the fourth aspect, in some implementations of the fourth aspect, when determining that online charging and offline charging do not need to be performed, the SMF sends a fifth message to the charging server, to request the charging server to terminate the online-offline convergent charging session.

According to a fifth aspect, a SMF is provided. The SMF includes a determining module and a sending module that can perform the method in any one of the first aspect or the optional implementations of the first aspect.

According to a sixth aspect, a charging server is provided. The charging server includes a receiving module and a sending module that can perform the method in any one of the second aspect or the optional implementations of the second aspect.

According to a seventh aspect, a charging server is provided. The charging server includes a receiving module, a determining module, and a sending module that can perform the method in any one of the third aspect or the optional implementations of the third aspect.

According to an eighth aspect, a SMF is provided. The SMF includes a sending module and a receiving module that can perform the method in any one of the fourth aspect or the optional implementations of the fourth aspect.

According to a ninth aspect, a communications apparatus is provided. The communications apparatus includes a memory and a processor. The memory stores program code that can be used to instruct to perform any one of the first aspect or the optional implementations of the first aspect, any one of the second aspect or the optional implementations of the second aspect, any one of the third aspect or the optional implementations of the third aspect, and any one of the fourth aspect or the optional implementations of the fourth aspect. When the program code is executed, the processor can implement various operations performed by the SMF and the charging server in the foregoing methods.

According to a tenth aspect, a chip system is provided. The chip system includes at least one processor. The at least one processor is configured to execute a stored instruction, to enable a SMF to perform the method in any one of the first aspect or the optional implementations of the first aspect and the method in any one of the fourth aspect or the optional implementations of the fourth aspect.

According to an eleventh aspect, a chip system is provided. The chip system includes at least one processor. The at least one processor is configured to execute a stored instruction, to enable a charging server to perform the method in any one of the second aspect or the optional implementations of the second aspect and the method in any one of the third aspect or the optional implementations of the third aspect.

According to a twelfth aspect, a computer program product is provided. The computer program product includes an instruction. When the instruction is executed, a SMF is enabled to perform the method in any one of the first aspect or the optional implementations of the first aspect and the method in any one of the fourth aspect or the optional implementations of the fourth aspect.

According to a thirteenth aspect, a computer program product is provided. The computer program product includes an instruction. When the instruction is executed, a charging server is enabled to perform the method in any one of the second aspect or the optional implementations of the second aspect and the method in any one of the third aspect or the optional implementations of the third aspect.

According to a fourteenth aspect, a computer storage medium is provided. The computer storage medium stores a program instruction. When the instruction is executed, a SMF is enabled to perform the method in any one of the first aspect or the optional implementations of the first aspect and the method in any one of the fourth aspect or the optional implementations of the fourth aspect.

According to a fifteenth aspect, a computer storage medium is provided. The computer storage medium stores a program instruction. When the instruction is executed, a charging server is enabled to perform the method in any one of the second aspect or the optional implementations of the second aspect and the method in any one of the third aspect or the optional implementations of the third aspect.

DESCRIPTION OF EMBODIMENTS

The following describes technical solutions in this application with reference to the accompanying drawings.

For ease of understanding of embodiments of this application, an OCS and an offline charging system in the other approaches are first described herein before the embodiments of this application are described.

The OCS is a system that performs charging management in real time based on use of a service. For online charging, quota granting is applied for before the service is used, and collected charging information is reported after the service is used, to implement real-time settlement. In 3G and 4G charging architectures, the OCS mainly includes a CTF, an OCF, a user balance management function, and a rating function. The CTF collects charging request events of a user from a data gateway in a data service domain, reports the events to the OCF, and obtains, from the OCF, the charging events and use authorization of a network resource requested by a corresponding event. The OCF queries the rating function and an user balance management function for a service price or a charging rate and user balance, and decides, after determining, whether to grant a use right of a network resource to a user applying for the service. During performance of the service, the OCF is responsible for calculating service fees in real time, and instructing the CTF to forcibly interrupt the service when the user balance is insufficient for maintaining the existing service.

The offline charging system reports collected charging information after a service is used, and charging does not affect use of the service in real time. In the 3G and 4G charging architectures, the offline charging system mainly includes a CTF, a CDF, and a charging gateway function (CGF). The CTF assembles the charging information into a charging event, and sends the charging event to the CDF through an Rf interface. The CDF constructs a charging detail record (CDR) using information included in the charging event, where the CDR is also referred to as a charging data record. After generating the CDR, the CDF transfers the CDR to the CGF. The CGF assembles the CDR into a CDR file, and transfers the CDR file to a charging center through a Bx interface, for processing.

Based on the charging architecture in which online charging is separated from offline charging, when configuring a product, an operator is confronted with complex coordination and cooperation between a plurality of systems, limiting flexibility of service provisioning of the operator. In a 5G, there are many limitations on industry application support, and because the charging system is limited by intervention of an external system in online charging and offline charging, processing performed by the charging system is complex.

Figure 1:
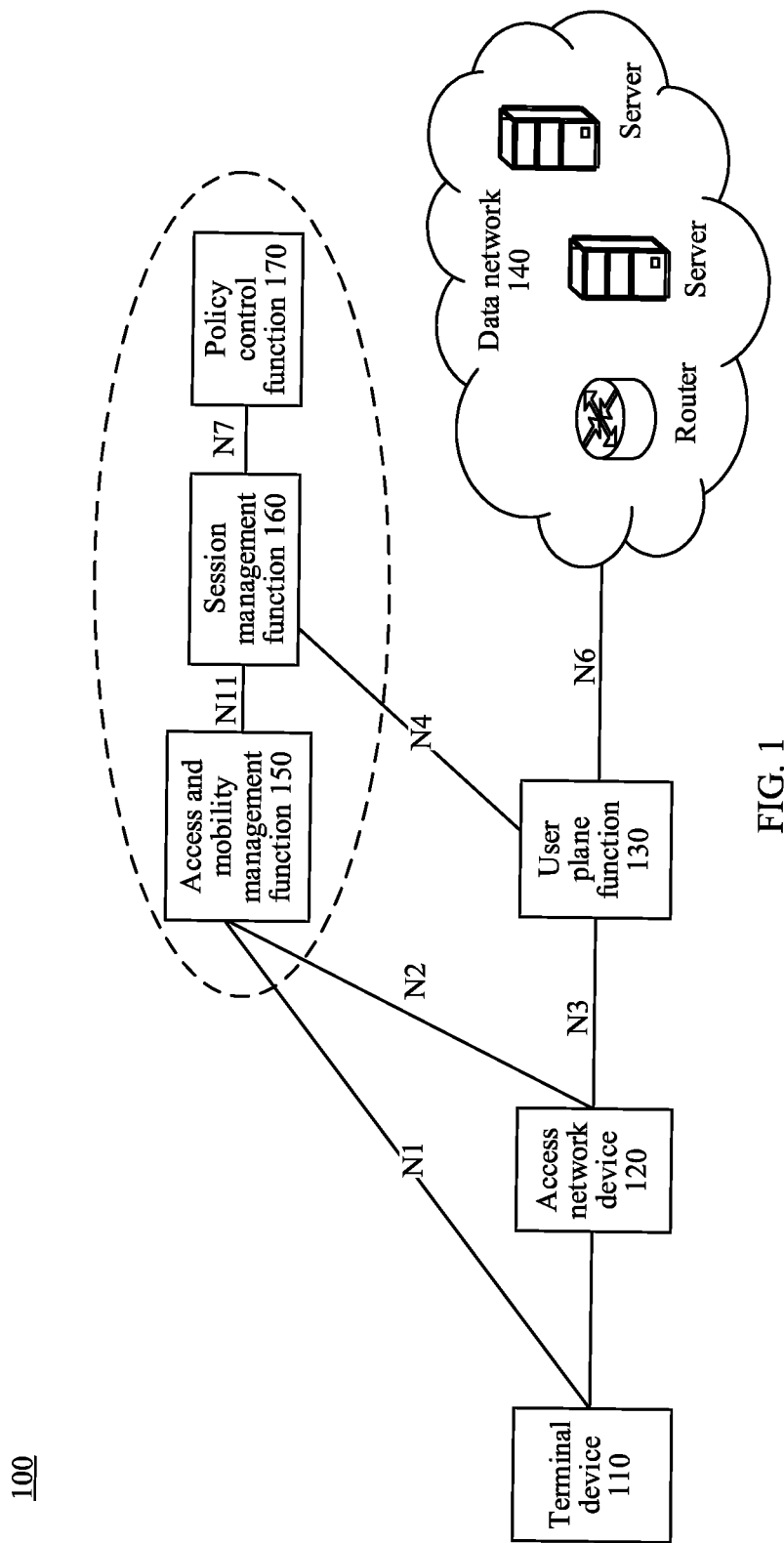
FIG. 1 is a schematic block diagram of a wireless communications system architecture of a convergent charging method and a device according to an embodiment of this application.

FIG. 1 is a schematic block diagram of a wireless communications system architecture 100 of a convergent charging method and a device according to this application. As shown in FIG. 1, the system architecture 100 includes a terminal device 110, an access network device 120, a user plane function 130 (UPF), a data network 140 (DN), an access and mobility management function 150 (AMF), a SMF 160, and a PCF 170. The functional units in FIG. 1 may implement communication by establishing a connection through a next generation network (NGN) interface. For example, the terminal device establishes an air interface connection to a radio access network (RAN) device/the access network (AN) device through a new radio (NR) interface, to transmit user plane data and control plane signaling. The terminal device may establish a control plane signaling connection to the AMF through an NG interface 1 (N1), the RAN device such as a 5G radio access NodeB (5GNB) may establish a user plane data connection to the UPF through an NG interface 3 (N3), the RAN device may establish a control plane signaling connection to the AMF through an NG interface 2 (N2), the UPF may establish a control plane signaling connection to the SMF through an NG interface 4 (N4), the UPF may exchange user plane data with the data network through an NG interface 6 (N6), the AMF may establish a control plane signaling connection to the SMF through an NG interface 11 (N11), and the SMF may establish a control plane signaling connection to the PCF through an NG interface 7 (N7).

The terminal device may be user equipment (UE) such as a mobile phone or a computer, or may be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite radio device, a wireless modem card, a set top box (STB), customer premise equipment (CPE), or another device for communication in a wireless system.

The access network device may be an AN/RAN device or a network including a plurality of 5G-AN/5G-RAN nodes. The 5G-AN/5G-RAN node may be an access node (AP), a next generation NodeB (gNB), a gNB in a form of separating a central unit (CU) from a distributed unit (DU), a transmission/reception point (TRP), a transmission point (TP), or another specific AP.

The functional units such as the AMF, the SMF, the PCF, and the user plane function may work independently, or may be combined together to implement some controls functions. For example, the AMF, the SMF, and the PCF may be combined together as a management device configured to implement, for the terminal device, access control and mobility management functions such as access authentication, security encryption, and location registration, SMFs such as establishment, release, and change of a user plane transmission path, and functions of analyzing some slice related data (such as a congestion) and terminal device related data. The UPF as a gateway device mainly completes functions such as routing and forwarding of user plane data, for example, is responsible for filtering of a data packet of the terminal device, data transmission/forwarding, rate control, and charging information generation.

It should be noted that FIG. 1 is merely an example architectural diagram. In addition to the functional units shown in FIG. 1, the network architecture may further include another functional unit or functional entity, for example, a core network device may further include another functional unit such as a unified data management function (unified data management, UDM). This is not limited in this embodiment of this application.

The technical solutions in the embodiments of this application may be applied to various communications systems, such as a global system of mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5G system, or a NR system.

Figure 2:
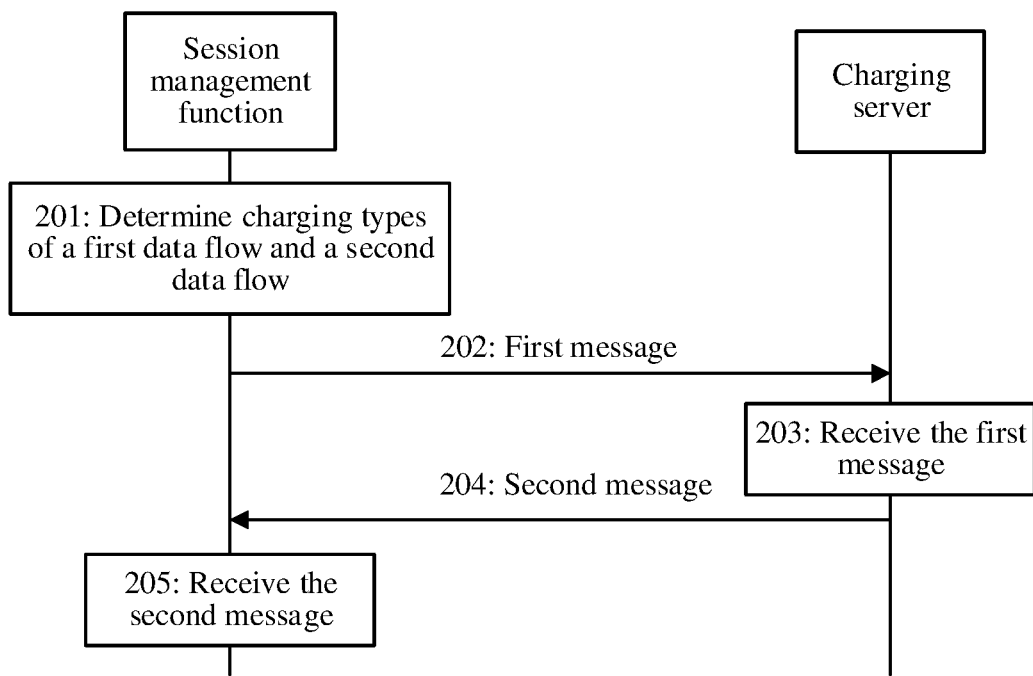
FIG. 2 is a schematic flowchart of a convergent charging method according to an embodiment of this application.

FIG. 2 is a schematic flowchart of a convergent charging method 200 according to this application. The method 200 may be applied to the scenario shown in FIG. 1, and certainly, may also be applied to another communication scenario. This is not limited in this embodiment of this application. As shown in FIG. 2, the method 200 includes the following content.

Step 201. A SMF determines charging types of a first data flow and a second data flow, where the charging type is online charging or offline charging.

Step 202. The SMF sends a first message to a charging server using an online-offline convergent charging session based on the charging types of the first data flow and the second data flow, where the first message includes a first online charging request of the first data flow, or the first message includes a first offline charging request of the second data flow, or the first message includes a first online charging request of the first data flow and a first offline charging request of the second data flow, and the online-offline convergent charging session is used to send the first online charging request and the first offline charging request.

It should be understood that the online-offline convergent charging session may be used to process not only online charging but also offline charging. The SMF may send the online charging request and the offline charging request using a same message, for example, the first message, or the SMF may send the online charging request and the offline charging request using different messages.

For example, the online charging request and the offline charging request are sent using different messages and the online-offline convergent charging session. The online charging request is sent using a message a, and the offline charging request is sent using a message b. Alternatively, the online charging request and the offline charging request may be included in a same message, for example, the online charging request and the offline charging request are included in the first message.

Step 203. The charging server receives, using the online-offline convergent charging session, the first message sent by the SMF.

Step 204. The charging server sends a second message to the SMF.

When the first message includes the first online charging request of the first data flow, the second message includes response information of the first online charging request. When the first message includes the first offline charging request of the second data flow, the second message includes response information of the first offline charging request. When the first message includes the first online charging request of the first data flow and the first offline charging request of the second data flow, the second message includes response information of the first online charging request and response information of the first offline charging request.

Step 205. The SMF receives the second message sent by the charging server.

Therefore, in this embodiment of this application, the SMF sends the first online charging request to the charging server using the online-offline convergent charging session, or the SMF sends the first offline charging request to the charging server using the online-offline convergent charging session, or the SMF sends the first online charging request and the first offline charging request to the charging server using the online-offline convergent charging session, to request online charging and offline charging based on the online-offline convergent charging session, simplify a charging architecture, and improve flexibility of service provisioning of an operator.

Optionally, in step 202, the first online charging request includes a first quota application, and the first offline charging request includes consumption information statistics, or the first offline charging request includes a second quota application and first indication information, indicating that the applied second quota is a virtual quota.

In an embodiment, when the charging type of the first data flow is online charging, the first message includes the first online charging request of the first data flow, and the first online charging request includes the first quota application.

When the charging type of the second data flow is offline charging, the first message includes the first offline charging request of the second data flow, and the first offline charging request includes the consumption information statistics.

When the charging type of the second data flow is offline charging, the first message includes the first offline charging request of the second data flow, the first offline charging request includes the second quota application and the first indication information, and the first indication information is used to indicate that the second quota is a virtual quota.

When the first data flow is online charging and the second data flow is offline charging, the first message includes the first online charging request of the first data flow and the first offline charging request of the second data flow, the first online charging request includes the first quota application, and the first offline charging request includes the consumption information statistics.

When the first data flow is online charging and the second data flow is offline charging, the first message includes the first online charging request of the first data flow and the first offline charging request of the second data flow, the first online charging request includes the first quota application, the first offline charging request includes the second quota application and the first indication information, and the first indication information is used to indicate that the second quota is a virtual quota.

The virtual quota is a virtual quota allocated by the charging server to the offline charging request, the virtual quota means that account balance is not actually deducted, and the SMF uses the virtual quota according to a normal quota use method. After receiving the reported virtual quota, the charging server writes a CDR instead of deducting a quota.

In step 204, optionally, the response information of the first online charging request includes a first quota allocated to the first quota application of the first data flow, and when the first offline charging request includes the consumption information statistics, the response information of the first offline charging includes a processing result of the consumption information statistics, or when the first offline charging request includes the second quota application and the first indication information, the response information of the first offline charging includes a second quota allocated to the second quota application of the second data flow and the first indication information.

In an embodiment, when the first online charging request includes the first quota application, the charging server allocates the first quota after receiving the first online charging request. When the first offline charging request includes the consumption information statistics, the charging server generates a charging data record. When the first offline charging request includes the second quota application and the first indication information, the charging server allocates the second quota based on the second quota application and the first indication information.

Optionally, the second message may further include an identifier corresponding to the first quota, and the identifier is used to indicate, when the SMF reports use information of the first quota to the charging server, to the charging server that the reported use information is usage of the first quota.

Optionally, the second message may further include a trigger condition corresponding to the first data flow.

For example, in the case of the online charging request, the second message includes the following content.

```
Granted Quota{
    RG=1, value=30 M, Quota ID=00001 //quota id
    Trigger
}
```

Where Trigger indicates a trigger condition, Quota ID is an identifier corresponding to an authorized quota of 30 M, and RG indicates a rating group corresponding to the authorized quota.

According to the technical solution provided in this embodiment of this application, the charging server processes, based on the first online charging request, the first offline charging request, or the first online charging request and the first offline charging request that are sent by the SMF to the charging server using the online-offline convergent charging session, the first online charging request and the first offline charging request, to request online charging and offline charging based on the online-offline convergent charging session, simplify a charging architecture, and improve flexibility of service provisioning of an operator.

Figure 3:
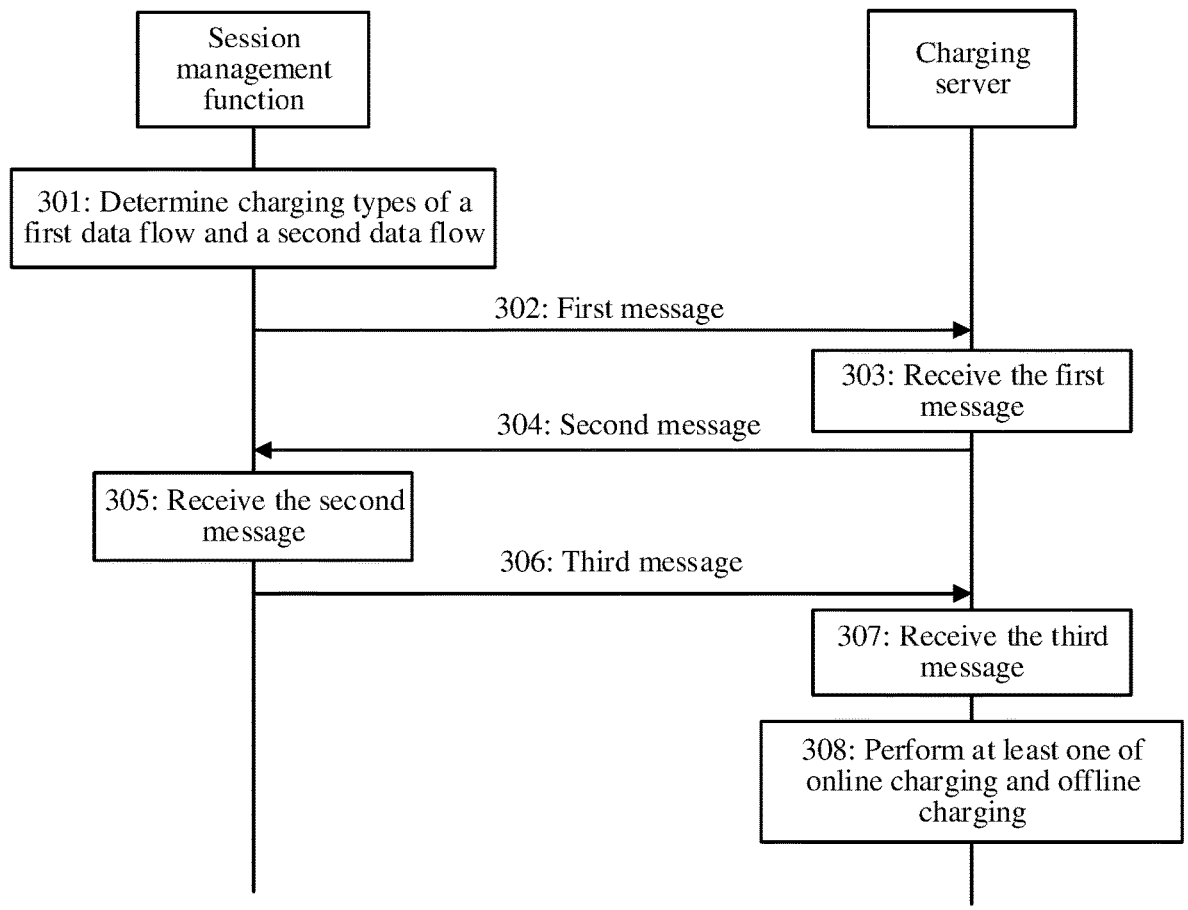
FIG. 3 is a schematic flowchart of a convergent charging method according to an embodiment of this application.

FIG. 3 is a schematic flowchart of a convergent charging method 300 according to an embodiment of this application. A difference from the embodiment in FIG. 2 lies in that the embodiment in FIG. 3 further includes step 306 to step 308 after step 205 in the embodiment in FIG. 2.

Step 306. The SMF sends a third message to the charging server.

Optionally, when a first charging trigger condition of the first data flow is satisfied, the SMF sends the third message to the charging server using the online-offline convergent charging session. The third message includes a second online charging request of the first data flow.

Optionally, when a second charging trigger condition of the second data flow is satisfied, the SMF sends the third message to the charging server using the online-offline convergent charging session, where the third message includes a second offline charging request of the second data flow.

Optionally, when a first charging trigger condition of the first data flow is satisfied and a second charging trigger condition of the second data flow is satisfied, the SMF sends the third message to the charging server using the online-offline convergent charging session, where the third message includes a second online charging request of the first data flow and a second offline charging request of the second data flow.

It should be understood that, for online charging, the trigger condition includes at least one of a trigger condition preconfigured on the SMF and a trigger condition delivered by the charging server, and for offline charging, the trigger condition is preconfigured on the SMF.

The SMF may send the online charging request and the offline charging request using a same message, for example, the third message. Alternatively, the SMF may send the online charging request and the offline charging request using different messages.

It should be understood that the first charging trigger condition may be a geographical location condition of a terminal device corresponding to the first data flow. For example, when a location of the terminal device changes, the first charging trigger condition is satisfied, and the SMF needs to send the third message to the charging server. Alternatively, the first charging trigger condition may be a change in an access network or a core network of a terminal device corresponding to the first data flow. For example, when the terminal device is handed over from a 3G system to a 4G system, the first charging trigger condition is satisfied, and the SMF needs to send the third message to the charging server. Alternatively, the first charging trigger condition may be a quota. For example, when the quota is used up to 90%, the first charging trigger condition is satisfied, and the SMF needs to send the third message to the charging server. The second charging trigger condition is similar to the first charging trigger condition.

Optionally, the second online charging request includes at least one of a third quota application and use information of the first quota, and the second offline charging request includes consumption information statistics, or the second offline charging request includes second indication information and at least one of use information of the second quota and a fourth quota application, and the second indication information is used to indicate that the fourth quota or the use information of the second quota is a virtual quota.

In an embodiment, for the online charging request, the second online charging request includes the third quota application, or the second online charging request includes the use information of the first quota, or the second online charging request includes the third quota application and the use information of the first quota. For the offline charging request, the second offline charging request includes the consumption information statistics, or the second offline charging request includes the use information of the second quota and the second indication information, and the second indication information is used to indicate that the second quota is a virtual quota, or the second offline charging request includes the fourth quota application and the second indication information, and the second indication information is used to indicate that the fourth quota is a virtual quota, or the second offline charging request includes the use information of the second quota, the fourth quota application, and the second indication information, and the second indication information is used to indicate that the fourth quota or the use information of the second quota is a virtual quota.

Optionally, the second indication information may alternatively be the first indication information.

Optionally, the third message further includes at least one of third indication information corresponding to the first data flow and fourth indication information corresponding to the second data flow, where the third indication information is used to instruct to perform online charging on the first data flow, and the fourth indication information is used to instruct to perform offline charging on the second data flow.

In an embodiment, the third message may further include the third indication information corresponding to the first data flow, or the third message may further include the fourth indication information corresponding to the second data flow, or the third message may further include the third indication information corresponding to the first data flow and the fourth indication information corresponding to the second data flow.

When the online charging request and the offline charging request use a same rating group, the charging server cannot distinguish between the online charging request and the offline charging request based on only the rating group, for example, cannot distinguish between use information of an online quota and offline consumption information statistics based on only the rating group. Therefore, the third indication information corresponding to the first data flow and the fourth indication information corresponding to the second data flow may be separately added to the third message, or only the third indication information corresponding to the first data flow may be added to the third message, or only the fourth indication information corresponding to the second data flow may be added to the third message. For example, the third indication information is used to identify the use information of the online quota, and the fourth indication information is used to identify the offline consumption information statistics, so that the charging server may distinguish, based on the third indication information or the fourth indication information, between the use information of the online quota and the offline consumption information that are reported in the third message.

If the third message carries the third indication information corresponding to the first data flow, the charging server performs online charging on the first data flow and performs offline charging on the second data flow. If the third message carries the fourth indication information corresponding to the second data flow, the charging server performs online charging on the first data flow and performs offline charging on the second data flow. If the third message carries the third indication information corresponding to the first data flow and the fourth indication information corresponding to the second data flow, the charging server performs online charging on the first data flow and performs offline charging on the second data flow.

Optionally, the third indication information may be a quota identifier or an online or offline indication.

For example, two forms are separately used to identify online charging and offline charging, as shown below.

Example 1

A quota identifier is used to distinguish between online charging and offline charging. In this example, the third message includes the third indication information, and the third indication information is a quota identifier. Content included in the third message is shown below.

```
Quota Request{//online charging request
  RG=1
}
Usage Report{//online charging request
  RG=1, 28 M, Quota ID=00001 // Quota ID is the third indication information, used to identify the online charging request
}
Usage Report{//offline charging request
  RG=1, 50 M
}
```

Example 2

An online or offline indication is used to distinguish between online charging and offline charging. In this example, the third message includes the third indication information corresponding to the first data flow and the fourth indication information corresponding to the second data flow. Content included in the third message is shown below.

```
Quota Request{RG=1 //online charging request
}
Usage Report{RG=1, 28 M, indicator=online //online charging request, indicator is the third indication information, used to identify the online charging request
}
Usage Report{RG=1, 50 M, indicator=offline //offline charging request, indicator is the fourth indication information, used to identify the offline charging request
}
```

In Example 1 and Example 2, RG is a rating group. It should be understood that, if there is no quota application with a special identifier in a request, it is considered by default that the request is an online charging request.

It should be understood that, the first message may further include the third indication information corresponding to the first data flow, or the first message may further include the fourth indication information corresponding to the second data flow, or the first message may further include the third indication information corresponding to the first data flow and the fourth indication information corresponding to the second data flow, where the third indication information is used to instruct to perform the online charging on the first data flow, and the fourth indication information is used to instruct to perform the offline charging on the second data flow.

It should be understood that, that the third message further includes the third indication information corresponding to the first data flow and the fourth indication information corresponding to the second data flow is also applicable to a case in which the online charging request and the offline charging request use different rating groups. In an embodiment, when the online charging request and the offline charging request use different rating groups, the third message further includes at least one of the third indication information corresponding to the first data flow and the fourth indication information corresponding to the second data flow, where the third indication information is used to instruct to perform online charging on the first data flow, and the fourth indication information is used to instruct to perform offline charging on the second data flow.

It should be understood that the third message has a response message corresponding to the third message. When the third message includes the second online charging request of the first data flow, the response message of the third message includes response information of the second online charging request. When the third message includes the second offline charging request of the second data flow, the response message of the third message includes response information of the second offline charging request. When the third message includes the second online charging request of the first data flow and the second offline charging request of the second data flow, the response message of the third message includes response information of the second online charging request and response information of the second offline charging request.

Step 307. The charging server receives the third message sent by the SMF.

Step 308. The charging server performs at least one of online charging and offline charging based on the third message sent by the SMF.

Optionally, for online charging, the charging server deducts the reserved first quota based on the use information of the first quota, or the charging server allocates the third quota based on the third quota application, or the charging server deducts the reserved first quota based on the use information of the first quota and allocates the third quota based on the third quota application. For offline charging, the charging server generates a charging data record based on the consumption information statistics, or the charging server generates a charging data record based on consumption information of the second quota and the second indication information, or the charging server allocates the fourth quota based on the fourth quota application and the second indication information, or the charging server generates a charging data record based on the second quota and the second indication information and allocates the fourth quota.

According to the technical solution provided in this embodiment of this application, the charging server processes, based on the second online charging request, the second offline charging request, or the second online charging request and the second offline charging request that are sent by the SMF to the charging server using the online-offline convergent charging session, the second online charging request and the second offline charging request, to request online charging and offline charging based on the online-offline convergent charging session, simplify a charging architecture, and improve flexibility of service provisioning of an operator.

Figure 4:
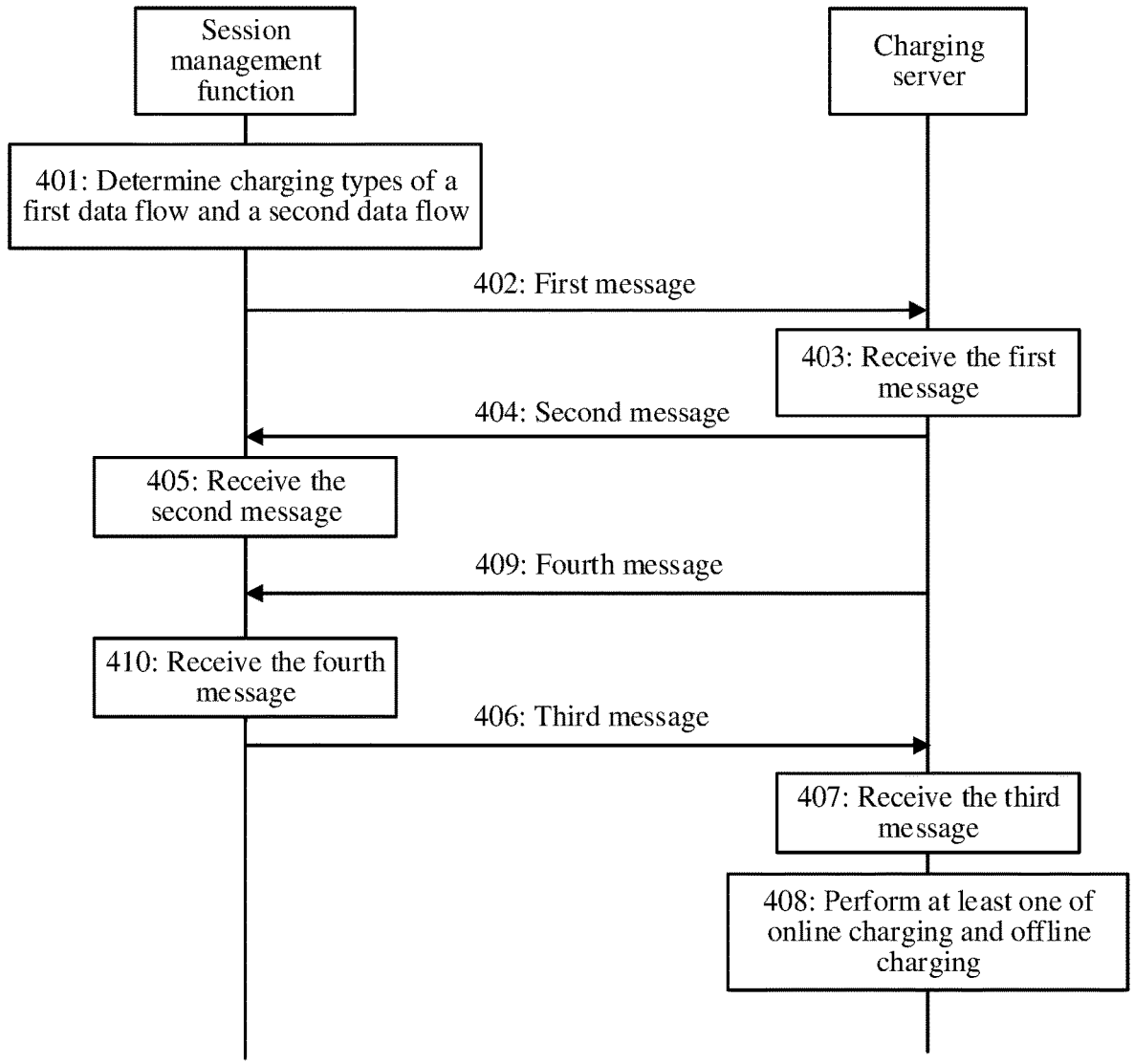
FIG. 4 is a schematic flowchart of a convergent charging method according to an embodiment of this application.

FIG. 4 is a schematic flowchart of a convergent charging method 400 according to an embodiment of this application. A difference from the embodiment in FIG. 3 lies in that the embodiment in FIG. 4 further includes step 409 and step 410 before step 306 in the embodiment in FIG. 3.

Step 409. Before the SMF sends the third message to the charging server using the online-offline convergent charging session, the SMF receives, using the online-offline convergent charging session, a fourth message sent by the charging server, where the fourth message is used to instruct to send the third message using the online-offline convergent charging session.

When the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

In an embodiment, when the online charging request and the offline charging request use the same rating group, the SMF cannot distinguish, based on only the rating group, between online charging and offline charging. Therefore, the third indication information corresponding to the first data flow and the fourth indication information corresponding to the second data flow may be separately added to the fourth message, or the third indication information corresponding to the first data flow may be added to the third message and the fourth indication information is not carried, or the fourth indication information corresponding to the second data flow may be added to the third message and the third indication information is not carried.

If the fourth message carries the same rating group and the third indication information, the third message sent by the SMF includes the second online charging request of the first data flow. If the fourth message carries the same rating group and the fourth indication information, the third message sent by the SMF includes the second offline charging request of the second data flow.

If the fourth message includes the same rating group, the third message sent by the SMF includes the second online charging request of the first data flow and the second offline charging request of the second data flow.

The third indication information may alternatively be a quota identifier or an online or offline indication.

It should be understood that, that the fourth message includes the third indication information corresponding to the first data flow and the fourth indication information corresponding to the second data flow is also applicable to a case in which the online charging request and the offline charging request use different rating groups. In an embodiment, when the online charging request and the offline charging request use different rating groups, the fourth message further includes at least one of the third indication information corresponding to the first data flow and the fourth indication information corresponding to the second data flow, where the third indication information is used to instruct to perform online charging on the first data flow, and the fourth indication information is used to instruct to perform offline charging on the second data flow.

Step 410. The SMF receives the fourth message, and sends the third message to the charging server based on the fourth message.

It should be understood that, the fourth message has a response message corresponding to the fourth message, and the third message may be sent after the response message of the fourth message.

Figure 5:
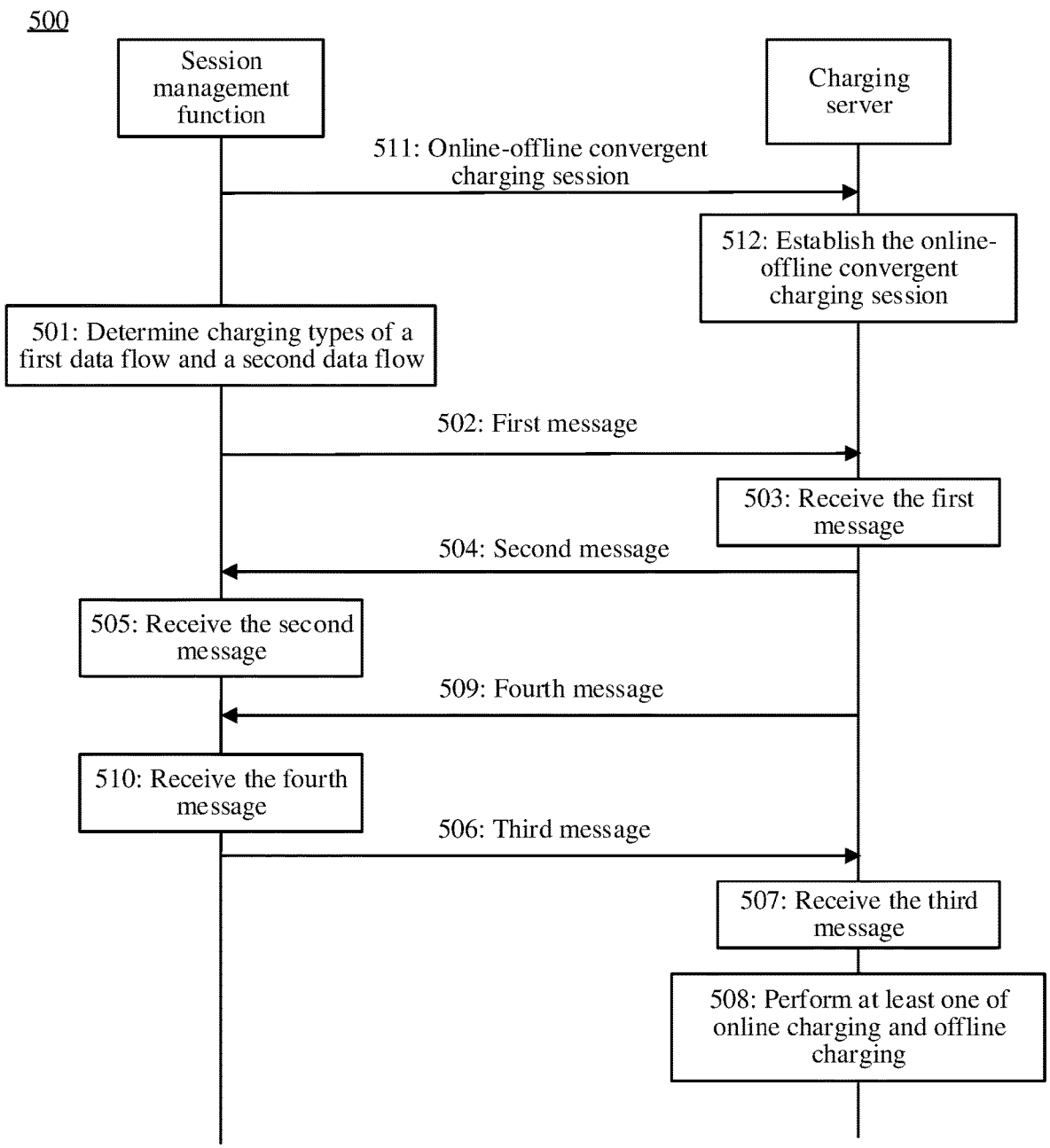
FIG. 5 is a schematic flowchart of a convergent charging method according to an embodiment of this application.

FIG. 5 is a schematic flowchart of a convergent charging method 500 according to an embodiment of this application. A difference from the embodiment in FIG. 4 lies in that the embodiment in FIG. 5 further includes step 511 and step 512 before step 401 in the embodiment in FIG. 4.

Step 511. Before sending the first message, the SMF sends an online-offline convergent charging session establishment request to the charging server, or the first message includes an online-offline convergent charging session establishment request.

In an embodiment, the SMF stores a PDU of a terminal device. When the SMF determines that online charging or offline charging needs to be performed on a data service in the PDU session of the terminal device, and the current PDU session of the terminal device has no corresponding online-offline charging convergent session, the SMF sends the online-offline convergent charging session establishment request to the charging server, or the SMF adds the online-offline convergent charging session establishment request to the first message, to establish an online-offline convergent charging session between the SMF and the charging server, and the online-offline convergent charging session is used to send an online charging request and an offline charging request that correspond to the PDU session of the terminal device.

Step 512. The charging server receives the online-offline convergent charging session establishment request, to establish the online-offline convergent charging session.

It should be understood that, if the SMF sends the online-offline convergent charging session establishment request to the charging server before sending the first message, the method further includes returning, by the charging server, a response to the online-offline convergent charging session establishment request to the SMF.

It should be understood that, if the first message includes the online-offline convergent charging session establishment request, the second message further includes the response to the online-offline convergent charging session establishment request.

Optionally, the method 500 further includes, when the SMF determines that online charging and offline charging do not need to be performed, sending, by the SMF, a fifth message to the charging server, to request the charging server to terminate the online-offline convergent charging session.

In an embodiment, when determining to perform online charging and offline charging, the SMF sends the fifth message to the charging server, where the fifth message includes use information of a quota allocated to the first data flow and the consumption information statistics of the second data flow, or use information statistics of a virtual quota of the second data flow.

It should be understood that, the fifth message may further include the third indication information corresponding to the first data flow, or the fifth message may further include the fourth indication information corresponding to the second data flow, or the fifth message may further include the third indication information corresponding to the first data flow and the fourth indication information corresponding to the second data flow, where the third indication information is used to identify the use information of the quota of the first data flow, and the fourth indication information is used to identify offline consumption information of the second data flow.

It should be understood that, when the PDU session corresponding to the online-offline convergent charging session is terminated, or an instruction for terminating the online-offline convergent charging session from the charging server is received, or there is no service traffic for a long time, or an instruction for performing no online charging and offline charging that is delivered by a PCF is received, the SMF may determine that online charging and offline charging do not need to be performed.

The charging server receives the fifth message, performs online charging and offline charging based on the fifth message, and terminates the online-offline convergent charging session.

In an embodiment, the charging server deducts a reserved quota based on the use information of the quota of the first data flow, or the charging server generates a charging data record based on the consumption information statistics of the second data flow, or based on the use information statistics of the virtual quota of the second data flow and the second indication information of the second data flow, and terminates the online-offline convergent charging session.

Optionally, the method 500 further includes obtaining, by the SMF, a static charging policy, or obtaining a dynamic charging policy of the PCF, where the dynamic charging policy and the static charging policy include the charging types of the first data flow and the second data flow, and determining, by the SMF according to the dynamic charging policy or the static charging policy, that the first data flow is online charging and the second data flow is offline charging.

In an embodiment, the charging policy includes the charging types of the first data flow and the second data flow. The SMF may determine the charging types of the first data flow and the second data flow according to the static charging policy stored by the SMF, or the SMF receives the dynamic charging policy sent by the PCF, and determines the charging types of the first data flow and the second data flow according to the dynamic charging policy. Charging policy parameters may include parameters shown in Table 1.

TABLE 1

Charging policy parameters

Figure 6:
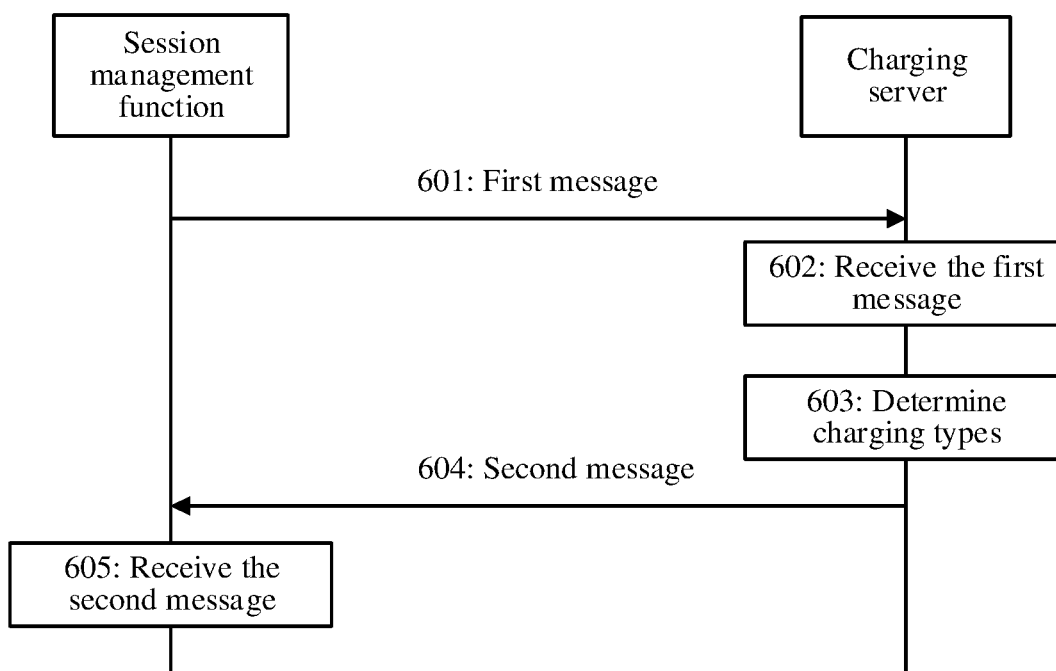
FIG. 6 is a schematic flowchart of a convergent charging method according to an embodiment of this application.

Rating Group: rating group
Service identifier: service identifier
Sponsor Identifier: sponsor identifier
Application Provider Identifier: application provider identifier
Charging method: online or offline or neither: charging method: online or offline or neither
Measurement method: volume, duration, combined volume/duration or event: measurement method: traffic, duration, combined traffic and duration, or event
Reporting Level: reporting level FIG. 6 is a schematic flowchart of a convergent charging method 600 according to this application. The method 600 may be applied to the scenario shown in FIG. 1, and certainly, may also be applied to another communication scenario. This is not limited in this embodiment of this application. As shown in FIG. 6, the method 600 includes the following content.

Step 601. A SMF sends a first message to a charging server using an online-offline convergent charging session, where the first message includes a first quota application of a first data flow, or the first message includes a second quota application of a second data flow, or the first message includes a first quota application of a first data flow and a second quota application of a second data flow, and the online-offline convergent charging session is used to send a first online charging request and the first offline charging request.

It should be understood that the online-offline convergent charging session may be used to process not only online charging but also offline charging. The SMF may send the first quota application of the first data flow and the second quota application of the second data flow using a same message, or the SMF may send the first quota application of the first data flow and the second quota application of the second data flow using different messages.

Step 602. The charging server receives, using the online-offline convergent charging session, the first message sent by the SMF.

Step 603. The charging server determines charging types of the first data flow and the second data flow based on the first message and a charging policy.

Step 604. The charging server sends a second message to the SMF using the online-offline convergent charging session based on the charging types of the first data flow and the second data flow.

When the charging server determines that the first data flow included in the first message is online charging, the second message includes a first quota allocated by the charging server to the first data flow.

When the charging server determines that the second data flow included in the first message is offline charging, the second message includes a second quota allocated by the charging server to the second data flow and first indication information allocated to the second data flow, and the first indication information is used to instruct the SMF to perform offline charging on the second data flow, or the second message includes a second quota that are allocated by the charging server to the second data flow and second indication information, and the second indication information is used to indicate that the second quota is a virtual quota. The first indication information may be the same as the second indication information.

Step 605. The SMF receives the second message using the online-offline convergent charging session.

Therefore, in this embodiment of this application, the SMF sends the first message to the charging server using the online-offline convergent charging session, where the first message includes the first quota application of the first data flow, or the first message includes the second quota application of the second data flow, or the first message includes the first quota application of the first data flow and the second quota application of the second data flow, to request online charging and offline charging based on the online-offline convergent charging session, simplify a charging architecture, and improve flexibility of service provisioning of an operator.

Optionally, in step 603, the determining, by the charging server, charging types of the first data flow and the second data flow based on the first message and a charging policy includes determining, by the charging server according to the charging policy, that the first data flow is online charging and the second data flow is offline charging.

In an embodiment, the charging policy includes the charging types of the first data flow and the second data flow, and the charging server may determine the charging types of the first data flow and the second data flow according to the charging policy. Charging policy parameters may include parameters shown in Table 2.

TABLE 2

Charging policy parameters

Charging policy parameters
Rating Group: rating group
Service identifier: service identifier
Sponsor Identifier: sponsor identifier
Application Service Provider Identifier: application provider identifier
Charging method: online or offline or neither: charging type: online or offline or neither
Measurement method: volume, duration, combined volume/duration or event: counting method: traffic, duration, combined traffic and duration, or event
Reporting Level: reporting level
Flow information: flow information Optionally, the method 600 further includes, when a PCF establishes a PDU session, receiving, by the charging server, a charging policy sent by the PCF and corresponding to the PDU session, or when receiving the first message sent by the SMF, requesting, by the charging server, a charging policy corresponding to the PDU session from a PCF.

In an embodiment, when establishing a PDU session for accessing a network by a terminal device, the PCF obtains accumulated charging information from the charging server, for policy decision-making. In this case, the PCF may send a charging policy related to the PDU session of the terminal device to the charging server. In this way, information exchange between the PCF and the charging server is reduced. However, the charging policy in this case is not a charging policy obtained after policy decision-making by the PCF. Therefore, the charging server needs to associate the charging policy of the PCF with the online-offline convergent charging session, to determine the online charging request and the offline charging request according to the charging policy.

Optionally, when the first data flow and the second data flow use a same rating group, when it is determined that the charging type of the first data flow is online charging, the second message further includes flow information of the first data flow corresponding to the first quota, or when it is determined that the charging type of the second data flow is offline charging, the second message includes flow information of the second data flow corresponding to the first indication information, or when it is determined that the charging type of the first data flow is offline charging, the second message includes flow information of the second data flow corresponding to the second quota.

In an embodiment, if the charging types of the first data flow and the second data flow are different, but the first data flow and the second data flow use the same rating group to request a quota, when the charging server sends an offline message corresponding to the rating group to the SMF, the charging server may deliver the flow information corresponding to the second data flow corresponding to the second quota, or may deliver the flow information corresponding to the first data flow corresponding to the first quota, and based on the flow information, the SMF performs online reporting on the first data flow and performs offline reporting on the second data flow.

It should be understood that the flow information may be a flow identifier or a flow feature (such as a quintuple a source internet protocol (IP) address, a source port, a destination IP address, a destination port, and a transport layer protocol). If the SMF has a correspondence between a flow identifier and a flow feature, the SMF delivers the flow identifier, otherwise, delivers a specific flow feature.

It should be understood that, that the second message includes the flow information corresponding to the first data flow and/or the flow information corresponding to the second data flow is also applicable to a case in which the online charging and the offline charging use different rating groups.

Figure 7:
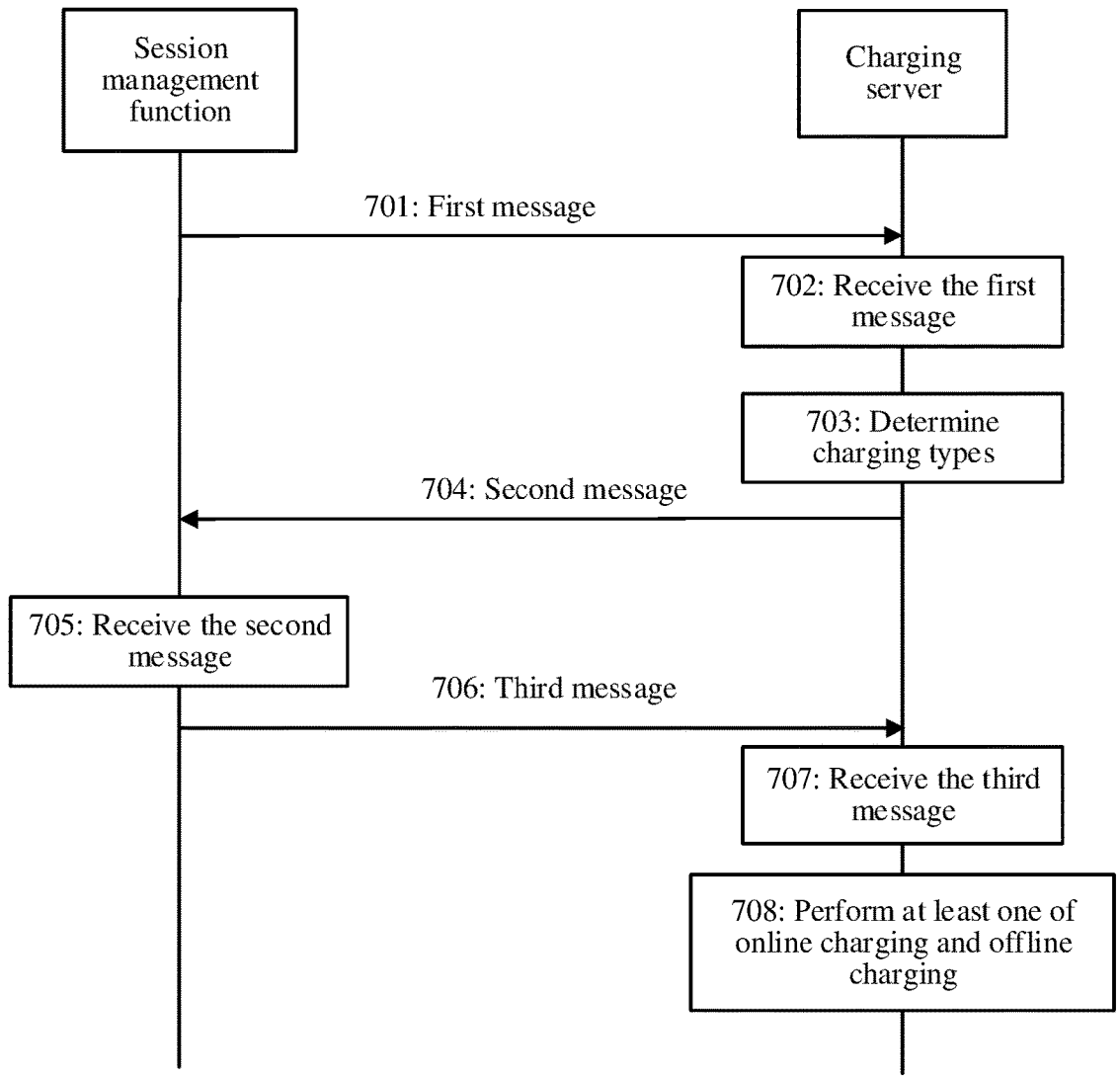
FIG. 7 is a schematic flowchart of a convergent charging method according to an embodiment of this application.

FIG. 7 is a schematic flowchart of a convergent charging method 700 according to an embodiment of this application. A difference from the embodiment in FIG. 6 lies in that the embodiment in FIG. 7 further includes step 706 to step 708 after step 605 in the embodiment in FIG. 6.

Step 706. The SMF sends a third message to the charging server.

Optionally, when a first charging trigger condition of the first data flow is satisfied, the SMF sends the third message to the charging server using the online-offline convergent charging session, where the third message includes a third quota application of the first data flow and/or consumption information of the first quota.

Optionally, when a second charging trigger condition of the second data flow is satisfied, the SMF sends the third message to the charging server using the online-offline convergent charging session, where the third message includes consumption information statistics of the second data flow or a fourth quota application, and second indication information, and the second indication information is used to indicate that the fourth quota is a virtual quota.

Optionally, when a second charging trigger condition of the second data flow is satisfied, the SMF sends the third message to the charging server using the online-offline convergent charging session, where the third message includes use information statistics of the second quota or a fourth quota application, and second indication information, and the second indication information is used to indicate that the fourth quota is a virtual quota.

Optionally, when a first charging trigger condition of the first data flow is satisfied and a second charging trigger condition of the second data flow is satisfied, the SMF sends the third message to the charging server using the online-offline convergent charging session, where the third message includes a third quota application of the first data flow and/or consumption information of the first quota, consumption information statistics of the second data flow or a fourth quota application, and second indication information, and the second indication information is used to indicate that the fourth quota is a virtual quota, or the third message includes a third quota application of the first data flow and/or consumption information of the first quota, use information statistics of the second quota or a fourth quota application, and second indication information, and the second indication information is used to indicate that the fourth quota is a virtual quota.

It should be understood that, for online charging, the trigger condition includes at least one of a trigger condition preconfigured on the SMF and a trigger condition delivered by the charging server, and for offline charging, the trigger condition is preconfigured on the SMF.

For explanations of the charging trigger condition, refer to related descriptions of the charging trigger condition in the method 300. To avoid repetition, details are not described herein again.

Optionally, the charging server receives, using the online-offline convergent charging session, the third message sent by the SMF, where the third message includes at least one of the third quota application of the first data flow and the consumption information of the first quota, or the consumption information statistics of the second data flow or the fourth quota application, and the second indication information, or consumption information of the second quota and the second indication information, and the second indication information is used to indicate a virtual quota.

Optionally, the third message further includes third indication information corresponding to the first data flow and/or fourth indication information corresponding to the second data flow, where the third indication information is used to instruct to perform online charging on the first data flow, and the fourth indication information is used to instruct to perform offline charging on the second data flow.

In an embodiment, the third message may further include the third indication information corresponding to the first data flow, or the third message may further include the fourth indication information corresponding to the second data flow, or the third message may further include the third indication information corresponding to the first data flow and the fourth indication information corresponding to the second data flow.

When the online charging request and the offline charging request use the same rating group, the charging server cannot distinguish between the online charging request and the offline charging request based on only the rating group. Therefore, the third indication information corresponding to the first data flow and the fourth indication information corresponding to the second data flow may be separately added to the third message, or the third indication information corresponding to the first data flow may be added to the third message, or the fourth indication information corresponding to the second data flow may be added to the third message.

If the third message carries only the third indication information corresponding to the first data flow, the charging server performs online charging on the first data flow and performs offline charging on the second data flow. If the third message carries only the fourth indication information corresponding to the second data flow, the charging server performs online charging on the first data flow and performs offline charging on the second data flow. If the third message carries the third indication information corresponding to the first data flow and the fourth indication information corresponding to the second data flow, the charging server performs online charging on the first data flow and performs offline charging on the second data flow.

Optionally, the third indication information may be a quota identifier or an online or offline indication.

Step 707. The charging server receives the third message sent by the SMF.

Step 708. The charging server performs online charging, or offline charging, or online charging and offline charging based on the third message.

Optionally, for online charging, the charging server deducts the reserved first quota based on the consumption information of the first quota, or the charging server allocates the third quota based on the third quota application, or the charging server deducts the reserved first quota based on the use information of the first quota, and allocates the third quota based on the third quota application. For offline charging, the charging server generates a charging data record based on the consumption information statistics of the second data flow, or the charging server allocates the fourth quota based on the fourth quota application and the second indication information, or the charging server generates a charging data record based on the consumption information of the second quota and the second indication information, or the charging server generates a charging data record based on the second quota and the second indication information, and allocates the fourth quota.

Figure 8:
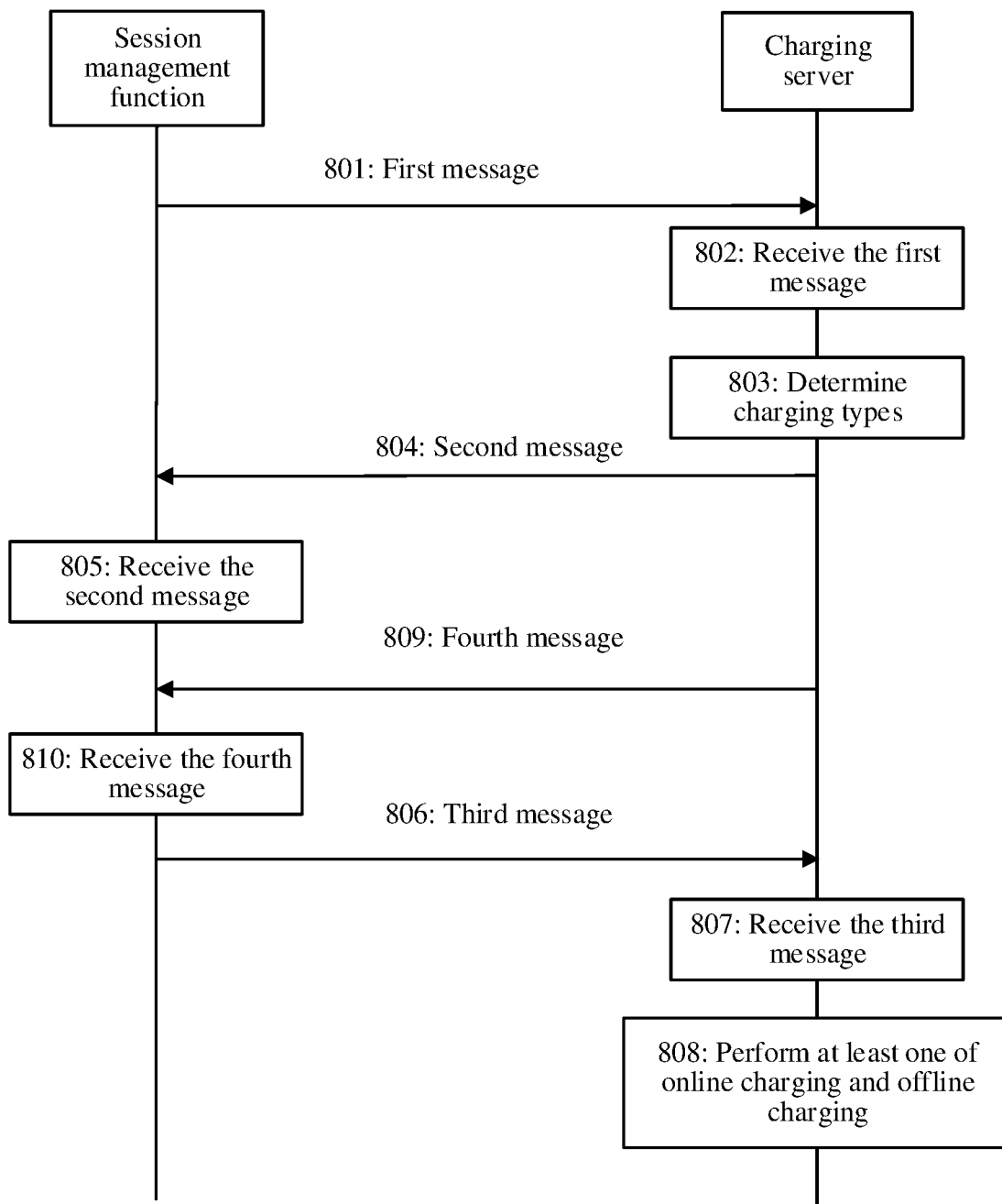
FIG. 8 is a schematic flowchart of a convergent charging method according to an embodiment of this application.

FIG. 8 is a schematic flowchart of a convergent charging method 800 according to an embodiment of this application. A difference from the embodiment in FIG. 7 lies in that the embodiment in FIG. 8 further includes step 809 and step 810 before step 706 in the embodiment in FIG. 7.

Step 809. Before the SMF sends the third message to the charging server using the online-offline convergent charging session, the SMF receives, using the online-offline convergent charging session, a fourth message sent by the charging server, where the fourth message is used to instruct to send the third message using the online-offline convergent charging session.

When the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

Step 810. The SMF receives the fourth message.

Figure 9:
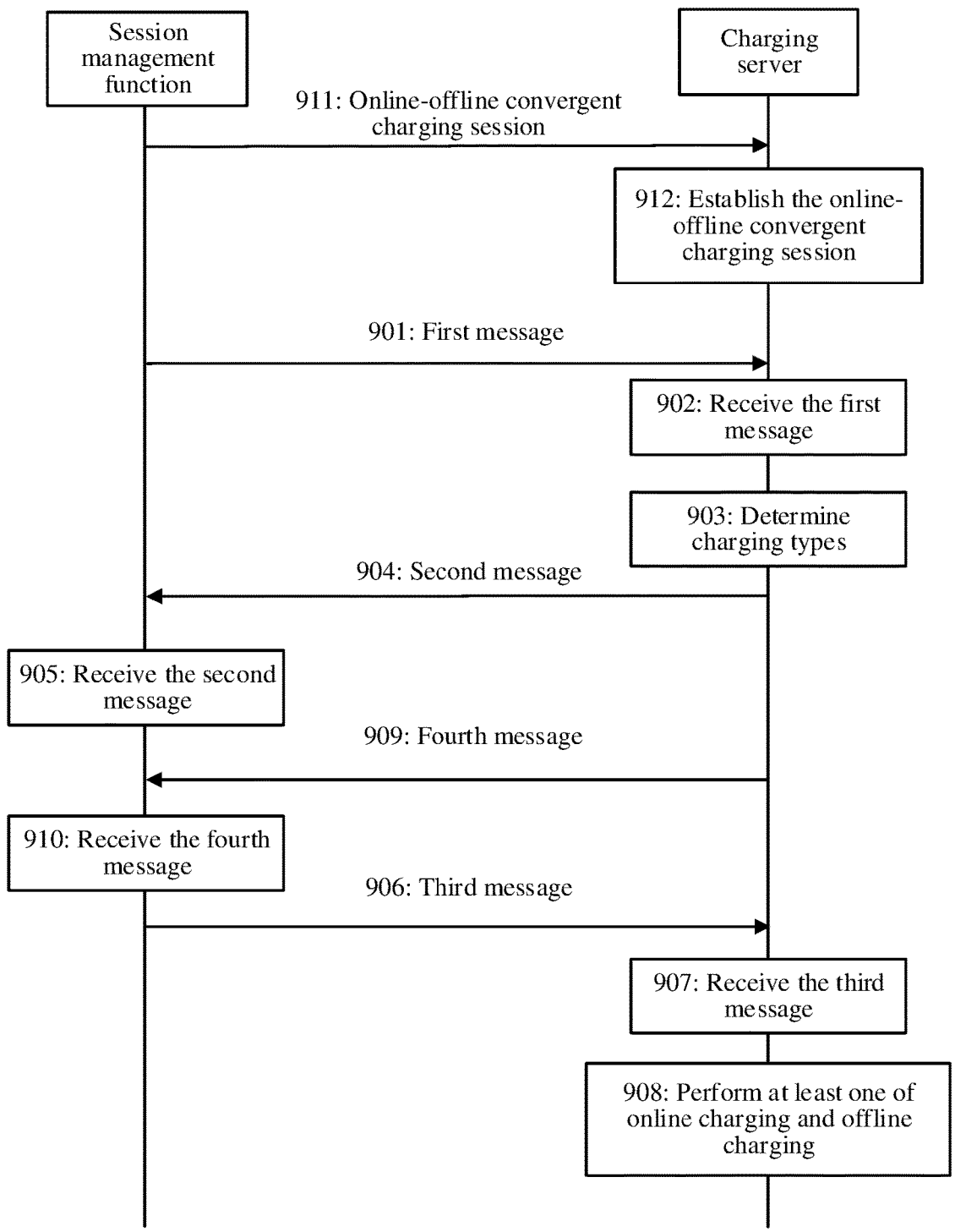
FIG. 9 is a schematic flowchart of a convergent charging method according to an embodiment of this application.

FIG. 9 is a schematic flowchart of a convergent charging method 900 according to an embodiment of this application. A difference from the embodiment in FIG. 8 lies in that the embodiment in FIG. 9 further includes step 911 and step 912 before step 801 in the embodiment in FIG. 8.

Step 911. Before the SMF sends the first message to the charging server using the online-offline convergent charging session, the SMF sends an online-offline convergent charging session establishment request to the charging server, or the first message includes an online-offline convergent charging session establishment request.

In an embodiment, the SMF stores a PDU session of a terminal device. When the SMF determines that online charging or offline charging needs to be performed on a data service in the PDU session of the terminal device, and the current PDU session of the terminal device has no corresponding online-offline charging convergent session, the SMF sends the online-offline convergent charging session establishment request to the charging server, or the SMF adds the online-offline convergent charging session establishment request to the first message, to establish an online-offline convergent charging session between the SMF and the charging server, and the online-offline convergent charging session is used to send an online charging request and an offline charging request that correspond to the PDU session of the terminal user.

Step 912. The charging server receives the online-offline convergent charging session establishment request, to establish the online-offline convergent charging session.

Optionally, the method 900 further includes, when the SMF determines that online charging and offline charging do not need to be performed, sending, by the SMF, a fifth message to the charging server, to request the charging server to terminate the online-offline convergent charging session.

In an embodiment, when determining to perform online charging and offline charging, the SMF sends the fifth message to the charging server, where the fifth message includes use information of a quota allocated to the first data flow and the consumption information statistics of the second data flow, or use information statistics of a virtual quota of the second data flow.

It should be understood that, when the PDU session corresponding to the online-offline convergent charging session is terminated, or an instruction for terminating the online-offline convergent charging session from the charging server is received, or there is no service traffic for a long time, or an instruction for performing no online charging and offline charging that is delivered by a PCF is received, the SMF may determine that online charging and offline charging do not need to be performed.

The charging server receives the fifth message, performs online charging and offline charging based on the fifth message, and terminates the online-offline convergent charging session.

In an embodiment, the charging server deducts a reserved quota based on the use information of the quota allocated to the first data flow, and the charging server generates a charging data record based on the consumption information statistics of the second data flow, or based on the use information statistics of the virtual quota of the second data flow and the second indication information of the second data flow, and terminates the online-offline convergent charging session.

Figure 10:
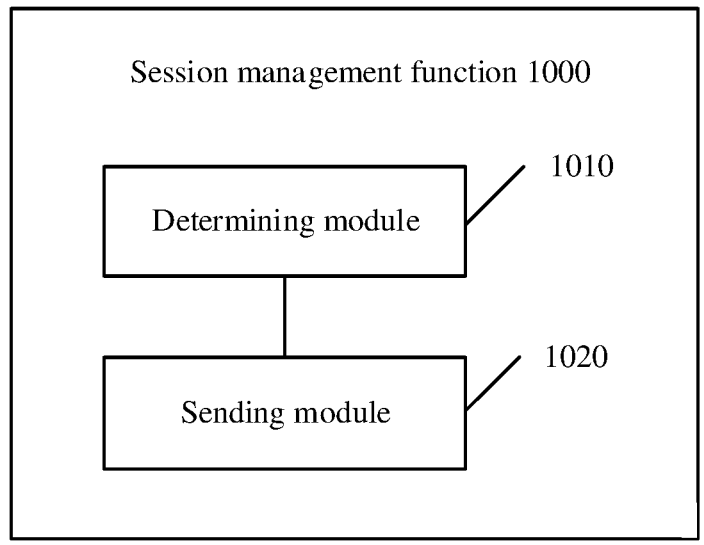
FIG. 10 is a schematic structural diagram of a SMF according to an embodiment of this application.

FIG. 10 is a schematic block diagram of a SMF 1000 according to this application. As shown in FIG. 10, the SMF 1000 includes a determining module 1010 configured to determine charging types of a first data flow and a second data flow, where the charging type is online charging or offline charging, and a sending module 1020 configured to send a first message to a charging server using an online-offline convergent charging session based on the charging types of the first data flow and the second data flow, where the first message includes a first online charging request of the first data flow, or the first message includes a first offline charging request of the second data flow, or the first message includes a first online charging request of the first data flow and a first offline charging request of the second data flow, and the online-offline convergent charging session is used to send the first online charging request and the first offline charging request.

Optionally, the first online charging request includes a first quota application, and the first offline charging request includes consumption information statistics, or the first offline charging request includes a second quota application and first indication information indicating that an applied second quota is a virtual quota.

Optionally, the SMF further includes a receiving module configured to receive, using the online-offline convergent charging session, a second message sent by the charging server, where the second message includes at least one of response information of the first online charging request and/or response information of the first offline charging request, the response information of the first online charging request includes a first quota allocated to the first quota application of the first data flow, and when the first offline charging request includes the consumption information statistics, the response information of the first offline charging includes a processing result of the consumption information statistics, or when the first offline charging request includes the second quota application and the first indication information, the response information of the first offline charging includes a second quota allocated to the second quota application of the second data flow and the first indication information.

Optionally, the sending module is further configured to, when a first charging trigger condition of the first data flow is satisfied, send a third message to the charging server using the online-offline convergent charging session, where the third message includes a second online charging request of the first data flow, or when a second charging trigger condition of the second data flow is satisfied, send a third message to the charging server using the online-offline convergent charging session, where the third message includes a second offline charging request of the second data flow, or when a first charging trigger condition of the first data flow is satisfied and a second charging trigger condition of the second data flow is satisfied, send a third message to the charging server using the online-offline convergent charging session, where the third message includes a second online charging request of the first data flow and a second offline charging request of the second data flow.

Optionally, the second online charging request includes at least one of a third quota application and use information of the first quota, and the second offline charging request includes consumption information statistics, or the second offline charging request includes second indication information and at least one of use information of the second quota and a fourth quota application, and the second indication information is used to indicate that the fourth quota or the use information of the second quota is a virtual quota.

Optionally, the third message further includes at least one of third indication information corresponding to the first data flow and fourth indication information corresponding to the second data flow, where the third indication information is used to instruct to perform online charging on the first data flow, and the fourth indication information is used to instruct to perform offline charging on the second data flow.

Optionally, the receiving module is further configured to, before the third message is sent to the charging server using the online-offline convergent charging session, receive, using the online-offline convergent charging session, a fourth message sent by the charging server, where the fourth message is used to instruct to send the third message using the online-offline convergent charging session, and when the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

Optionally, the sending module is further configured to, before sending the first message, send an online-offline convergent charging session establishment request to the charging server, or send the first message to the charging server, where the first message includes an online-offline convergent charging session establishment request.

Optionally, the sending module is further configured to, when it is determined that online charging and offline charging do not need to be performed, send a fifth message to the charging server, to request the charging server to terminate the online-offline convergent charging session.

Optionally, the SMF further includes an obtaining module, where the obtaining module is configured to obtain a static charging policy or obtain a dynamic charging policy of a PCF, where the dynamic charging policy and the static charging policy include the charging types of the first data flow and the second data flow, and the determining module is further configured to determine, by the SMF according to the dynamic charging policy or the static charging policy, that the charging type of the first data flow is online charging and the charging type of the second data flow is offline charging.

Optionally, the SMF 1000 is configured to perform various operations performed by the SMF in the convergent charging method 200 to the convergent charging method 500 in this application. For brevity, details are not described herein again.

Figure 11:
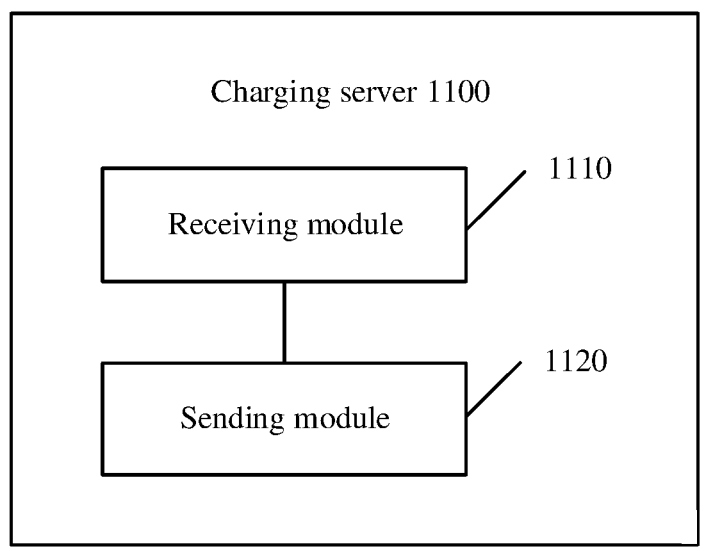
FIG. 11 is a schematic structural diagram of a charging server according to an embodiment of this application.

FIG. 11 is a schematic block diagram of a charging server 1100 according to this application. As shown in FIG. 11, the charging server 1100 includes a receiving module 1110 configured to receive, using an online-offline convergent charging session, a first message sent by a SMF, where the first message includes a first online charging request of the first data flow, or the first message includes a first offline charging request of the second data flow, or the first message includes a first online charging request of the first data flow and a first offline charging request of the second data flow, and the online-offline convergent charging session is used to send the first online charging request and the first offline charging request, and a sending module 1120 configured to send a second message to the SMF, where when the first message includes the first online charging request of the first data flow, the second message includes response information of the first online charging request, when the first message includes the first offline charging request of the second data flow, the second message includes response information of the first offline charging request, or when the first message includes the first online charging request of the first data flow and the first offline charging request of the second data flow, the second message includes response information of the first online charging request and response information of the first offline charging request.

Optionally, the response information of the first online charging request includes a first quota allocated to a first quota application of the first data flow, and when the first offline charging request includes the consumption information statistics, the response information of the first offline charging includes a processing result of the consumption information statistics, or when the first offline charging request includes the second quota application and first indication information, the response information of the first offline charging includes a second quota allocated to the second quota application of the second data flow and the first indication information.

Optionally, the receiving module is further configured to receive, using the online-offline convergent charging session, a third message sent by the SMF, where the third message includes a second online charging request of the first data flow, or a second offline charging request of the second data flow, or a second online charging request of the first data flow and a second offline charging request of the second data flow.

Optionally, the second online charging request includes at least one of a third quota application and consumption information of the first quota, and the second offline charging request includes the consumption information statistics, or the second offline charging request includes consumption information of the second quota or a fourth quota application, and second indication information, and the second indication information is used to indicate that a fourth quota is a virtual quota.

Optionally, the third message further includes third indication information corresponding to the first data flow and/or fourth indication information corresponding to the second data flow, where the third indication information is used to instruct to perform online charging on the first data flow, and the fourth indication information is used to instruct to perform offline charging on the second data flow.

Optionally, the charging server further includes a processing module configured to deduct the reserved first quota based on the use information of the first quota, or allocate the third quota based on the third quota application, or generate a charging data record based on the consumption information statistics, or generate a charging data record based on the consumption information of the second quota and the second indication information, or allocate the fourth quota based on the fourth quota application and the second indication information.

Optionally, the sending module is further configured to, before the third message is received, send a fourth message to the SMF using the online-offline convergent charging session, where the fourth message is used to instruct to send the third message using the online-offline convergent charging session, and when the first data flow and the second data flow correspond to a same rating group, when the fourth message includes the same rating group, the third message includes the second online charging request of the first data flow and the second offline charging request of the second data flow, or when the fourth message includes the same rating group and the third indication information, the third message includes the second online charging request of the first data flow, or when the fourth message includes the same rating group and the fourth indication information, the third message includes the second offline charging request of the second data flow.

Optionally, the receiving module is further configured to, before receiving the first message, receive an online-offline convergent charging session request sent by the SMF, to establish the online-offline convergent charging session, or receive the first message including an online-offline convergent charging session establishment request, to establish the online-offline convergent charging session.

Optionally, the receiving module is further configured to receive, by the charging server, a fifth message sent by the SMF, and the processing module is further configured to terminate the online-offline convergent charging session based on the fifth message.

Optionally, the charging server 1100 is configured to perform various operations performed by the charging server in the convergent charging method 200 to the convergent charging method 500 in this application. For brevity, details are not described herein again.

Figure 12:
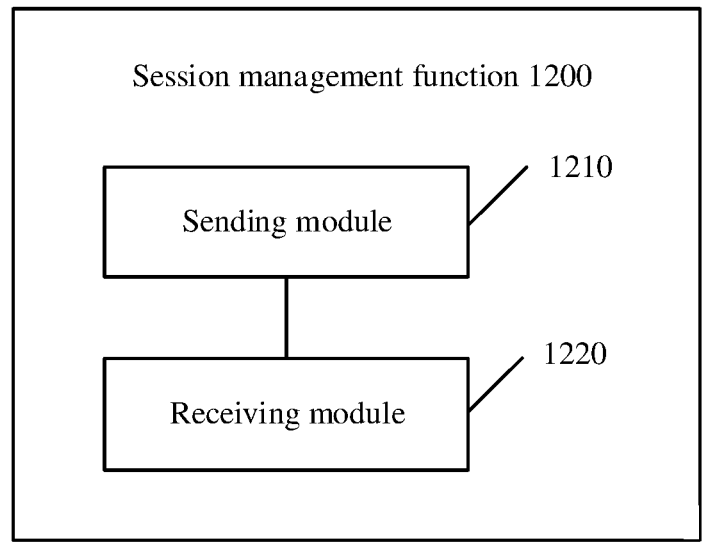
FIG. 12 is a schematic structural diagram of a SMF according to an embodiment of this application.

FIG. 12 is a schematic block diagram of a SMF 1200 according to this application. As shown in FIG. 12, the SMF 1200 includes a sending module 1210 configured to send a first message to a charging server using an online-offline convergent charging session, where the first message includes a first quota application of a first data flow, or the first message includes a second quota application of the second data flow, or the first message includes a first quota application of a first data flow and a second quota application of the second data flow, and the online-offline convergent charging session is used to send the first online charging request and the first offline charging request, and a receiving module 1220 configured to receive, using the online-offline convergent charging session, a second message sent by the charging server, where when the first message includes the first quota application of the first data flow, the second message includes a first quota allocated by the charging server to the first data flow, when the first message includes the second quota application of the second data flow, the second message includes a second quota allocated to the second data flow and first indication information allocated to the second data flow, and the first indication information is used to instruct the SMF to perform offline charging on the second data flow, or the second message includes the second quota that are allocated by the charging server to the second data flow and second indication information, and the second indication information is used to indicate that the second quota is a virtual quota, or when the first message includes the first quota application of the first data flow and the second quota application of the second data flow, the second message includes a first quota allocated by the charging server to the first data flow, the second quota application of the second data flow, and first indication information allocated to the second data flow, and the first indication information is used to instruct the SMF to perform offline charging on the second data flow, or a second message includes the first quota allocated by the charging server to the first data flow and the second quota that are allocated by the charging server to the second data flow and second indication information, and the second indication information is used to indicate that the second quota is a virtual quota.

Optionally, the SMF 1200 is configured to perform various operations performed by the SMF in the convergent charging method 600 to the convergent charging method 900 in this application. For brevity, details are not described herein again.

Figure 13:
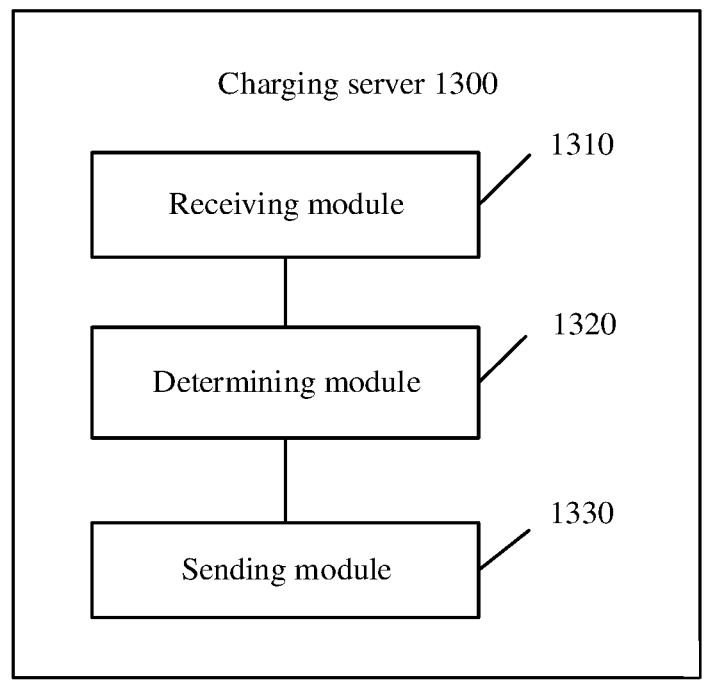
FIG. 13 is a schematic structural diagram of a charging server according to an embodiment of this application.

FIG. 13 is a schematic block diagram of a charging server 1300 according to this application. As shown in FIG. 13, the charging server 1300 includes a receiving module 1310 configured to receive, using an online-offline convergent charging session, a first message sent by a SMF, where the first message includes a first quota application of a first data flow, or the first message includes a second quota application of the second data flow, or the first message includes a first quota application of a first data flow and a second quota application of the second data flow, and the online-offline convergent charging session is used to send the first online charging request and the first offline charging request, and a determining module 1320 configured to determine charging types of the first data flow and the second data flow, where the charging type is online charging or offline charging, and a sending module 1330 configured to send a second message to the SMF using the online-offline convergent charging session based on the charging types of the first data flow and the second data flow, where when the first message includes the first quota application of the first data flow, the second message includes a first quota allocated by the charging server to the first data flow, when the first message includes the second quota application of the second data flow, the second message includes the second quota application of the second data flow and first indication information allocated to the second data flow, and the first indication information is used to instruct the SMF to perform offline charging on the second data flow, or the second message includes the second quota that are allocated by the charging server to the second data flow and second indication information, and the second indication information is used to indicate that the second quota is a virtual quota, or when the first message includes the first quota application of the first data flow and the second quota application of the second data flow, the second message includes a first quota allocated by the charging server to the first data flow, the second quota application of the second data flow, and first indication information allocated to the second data flow, and the first indication information is used to instruct the SMF to perform offline charging on the second data flow, or the second message includes a first quota allocated by the charging server to the first data flow and the second quota that are allocated by the charging server to the second data flow and second indication information, and the second indication information is used to indicate that the second quota is a virtual quota.

Optionally, the charging server 1300 is configured to perform various operations performed by the charging server in the convergent charging method 600 to the convergent charging method 900 in this application. For brevity, details are not described herein again.

The SMF and the charging server completely correspond to the SMF and the charging server in the method embodiments, and corresponding modules perform corresponding steps. For details, refer to the corresponding method embodiments.

Figure 14:
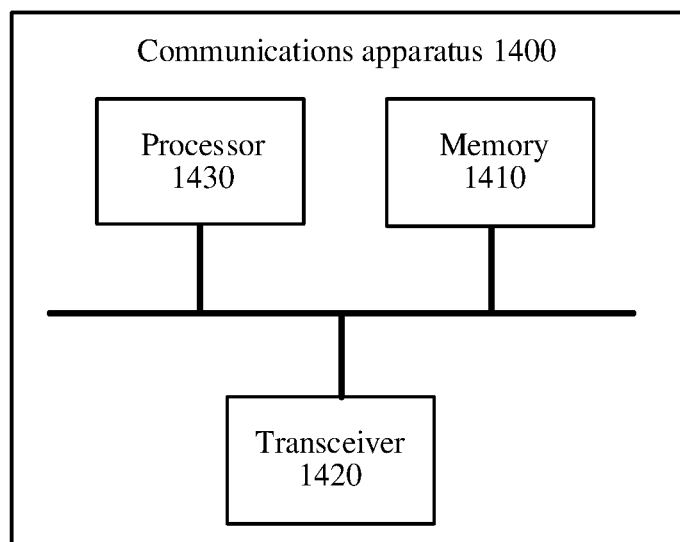
FIG. 14 is a schematic structural diagram of a communications apparatus according to an embodiment of this application.

FIG. 14 is a schematic block diagram of a communications apparatus 1400 according to this application. The communications apparatus 1400 includes a memory 1410 configured to store a program, where the program includes code, a transceiver 1420 configured to communicate with another device, and a processor 1430 configured to execute program code in the memory 1410.

Optionally, when the code is executed, the processor 1430 can implement various operations in the method 200 or the method 300. For brevity, details are not described herein again. In this case, the communications apparatus 1400 may be a SMF or a charging server. The transceiver 1420 is configured to send and receive a specific signal when driven by the processor 1430.

This application provides a chip system, including at least one processor. The at least one processor is configured to execute a stored instruction, to enable the SMF to implement various operations in the method 200 to the method 900.

This application provides a chip system, including at least one processor. The at least one processor is configured to execute a stored instruction, to enable the charging server to implement various operations in the method 200 to the method 900.

This application provides a computer program product. The computer program product includes an instruction. When the instruction is executed, the SMF is enabled to implement various operations in the method 200 to the method 900.

This application provides a computer program product. The computer program product includes an instruction. When the instruction is executed, the charging server is enabled to implement various operations in the method 200 to the method 900.

This application provides a computer storage medium. The computer storage medium stores a program instruction. When the instruction is executed, the SMF is enabled to implement various operations in the method 200 to the method 900.

This application provides a computer storage medium. The computer storage medium stores a program instruction. When the instruction is executed, the charging server is enabled to implement various operations in the method 200 to the method 900.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus flash drive, a removable hard disk, a read-only memory (ROM), a random access memory (RAM), a magnetic disk, or an optical disc.

All or some of the foregoing embodiments may be implemented using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A convergent charging method implemented by a session management function, the convergent charging method comprising:
   determining a charging type of a first data flow, wherein the charging type of the first data flow is online charging;
   sending, based on the charging type of the first data flow, a first message comprising a first online charging request for the first data flow, to a charging server, the first message being associated with an online-offline convergent charging session;
   determining a charging type of a second data flow, wherein the charging type of the second data flow is offline charging; and sending, based on the charging type of the second data flow, a second message comprising a first offline charging request for the second data flow to the charging sever, the second message being associated with the online-offline convergent charging session, wherein the online-offline convergent charging session corresponds to a protocol data unit session transmitting the first data flow and the second data flow, and wherein the online-offline convergent charging session is for transmitting the first message and the second message.

2. The convergent charging method of claim 1, wherein the first online charging request comprises a first quota application of the first data flow, and wherein the first offline charging request comprises first consumption information statistics.

3. The convergent charging method of claim 2, further comprising receiving, using the online-offline convergent charging session, first response information for the first online charging request and second response information for the first offline charging request, wherein the first response information comprises a first quota allocated to the first quota application, and wherein the second response information comprises a processing result of the first consumption information statistics when the first offline charging request comprises the first consumption information statistics.

4. The convergent charging method of claim 2, further comprising:
sending a third message comprising a second online charging request for the first data flow to the charging server when a first charging trigger condition of the first data flow is satisfied; or
sending a third message comprising a second offline charging request for the second data flow to the charging server when a second charging trigger condition of the second data flow is satisfied.

5. The convergent charging method of claim 4,
wherein the second online charging request comprises first indication information corresponding to the first data flow, and wherein the first indication information instructs to perform online charging on the first data flow; or
wherein the second offline charging request comprises second indication information corresponding to the second data flow, and wherein the second indication information instructs to perform offline charging on the second data flow.

6. The convergent charging method of claim 4, wherein the first data flow and the second data flow correspond to a same rating group, wherein the method further comprises receiving an instructing message from the charging server, and wherein the instructing message instructs to send the second online charging request or the second offline charging request message.

7. The convergent charging method of claim 1, wherein the convergent charging method further comprises sending a terminating message to the charging server to request the charging server to terminate the online-offline convergent charging session when online charging and offline charging do not need to be performed.

8. A convergent charging method implemented by a charging server, the convergent charging method comprising:
receiving a first message comprising a first online charging request for a first data flow from a session management function, the first message being associated with the online-offline convergent charging session;

sending first response information of the first online charging request to the session management function;
receiving a second message comprising a first offline charging request for a second data flow from the session management function, the second message being associated with the online-offline convergent charging session; and
sending second response information of the first offline charging request to the session management function,
wherein the online-offline convergent charging session corresponds to a protocol data unit session transmitting the first data flow and the second data flow, and wherein the online-offline convergent charging session is for transmitting the first message and the second message.

9. The convergent charging method of claim 8, wherein the first response information comprises a first quota allocated to a first quota application of the first data flow, and wherein the second response information comprises a processing result of consumption information statistics when the first offline charging request comprises the consumption information statistics.

10. The convergent charging method of claim 9, further comprising:
receiving a third message comprising a second online charging request for the first data flow from the session management function; and
receiving a fourth message comprising a second offline charging request of the second data flow from the session management function.

11. The convergent charging method of claim 10,
wherein the second online charging request comprises first indication information corresponding to the first data flow, and wherein the first indication information instructs to perform online charging on the first data flow, or
wherein the second offline charging request comprises second indication information corresponding to the second data flow, wherein the second indication information instructs to perform offline charging on the second data flow.

12. The convergent charging method of claim 11, wherein the first data flow and the second data flow correspond to a same rating group, wherein the convergent charging method further comprises receiving an instructing message from the charging server, and wherein the instructing message instructs to send the second online charging request or the second offline charging request message.

13. A session management function, comprising:
a processor; and
a memory coupled to the processor and storing instructions that, when executed by the processor, cause the processor to be configured to:
determine a charging type of a first data flow, wherein the charging type of the first data flow is online charging;
send, based on the charging type of the first data flow, a first message comprising a first online charging request of the first data flow to a charging server, the first message being associated with an online-offline convergent charging session;
determine a charging type of a second data flow, wherein the charging type of the second data flow is offline charging; and
send, based on the charging type of the second data flow, a second message comprising a first offline charging request for the second data flow to the charging sever, the second message being associated with the online-offline convergent charging session, wherein the online-offline convergent charging session corresponds to a protocol data unit session transmitting the first data flow and the second data flow, and wherein the online-offline convergent charging session is for transmitting the first message and the second message.

14. The session management function of claim 13, wherein the first online charging request comprises a first quota application of the first data flow, and wherein the first offline charging request comprises consumption information statistics.

15. The session management function of claim 14, wherein the instructions further cause the processor to be configured to receive, using the online-offline convergent charging session, first response information for the first online charging request and second response information for the first offline charging request, wherein the first response information comprises a first quota allocated to the first quota application, and wherein the second response information comprises a processing result of the consumption information statistics.

16. The session management function of claim 14, wherein the instructions further cause the processor to be configured to:
send a third message comprising a second online charging request for the first data flow to the charging server when a first charging trigger condition of the first data flow is satisfied; or
send a third message comprising a second offline charging request for the second data flow to the charging server when a second charging trigger condition of the second data flow is satisfied.

17. The session management function of claim 16,
wherein the second online charging request further comprises first indication information corresponding to the first data flow, and wherein the first indication information instructs to perform online charging on the first data flow, or
wherein the second offline charging request comprises second indication information corresponding to the second data flow, and wherein the second indication information instructs to perform offline charging on the second data flow.

18. The session management function of claim 16, wherein the first data flow and the second data flow correspond to a same rating group, wherein the instructions cause the processor to be further configured to receive, an instructing message from the charging server, and wherein the instructing message instructs to send the second online charging request or the second offline charging request message.

19. A charging server, comprising:
a processor; and
a memory coupled to the processor and storing instructions that, when executed by the processor, cause the processor to be configured to:
receive a first message comprising a first online charging request for a first data flow from a session management function, the first message being associated with the online-offline convergent charging session;
send first response information for the first online charging request to the session management function;
receive a second message comprising a first offline charging request for a second data flow from the session management function, the second message being associated with the online-offline convergent charging session; and
send second response information of the first offline charging request to the session management function,
wherein the online-offline convergent charging session corresponds to a protocol data unit session transmitting the first data flow and the second data flow, and the online-offline convergent charging session is for transmitting the first message and the second message.

20. The charging server of claim 19, wherein the instructions further cause the processor to be configured to receive a second online charging request for the first data flow from the session management function and a second offline charging request of the second data flow from the session management function.

21. A convergent charging method, comprising:
determining, by a session management function, a charging type of a first data flow, wherein the charging type of the first data flow is online charging;
sending, by the session management function based on the charging type of the first data flow, a first message comprising a first online charging request for the first data flow, to a charging server, the first message being associated with an online-offline convergent charging session;
sending, by the charging server, first response information of the first online charging request to the session management function;
determining, by the session management function, a charging type of a second data flow, wherein the charging type of the second data flow is offline charging;
sending, by the session management function, based on the charging type of the second data flow, a second message comprising a first offline charging request for the second data flow to the charging sever, the second message being associated with the online-offline convergent charging session; and
sending, by the charging server, first response information of the first online charging request to the session management function,
wherein the online-offline convergent charging session corresponds to a protocol data unit session transmitting the first data flow and the second data flow, and wherein the online-offline convergent charging session is for transmitting the first message and the second message.

* * * * *